United States Patent
Qadir et al.

(10) Patent No.: US 12,181,889 B2
(45) Date of Patent: Dec. 31, 2024

(54) METHOD FOR CONTROLLING A VEHICLE FOR HARVESTING AGRICULTURAL MATERIAL

(71) Applicant: Deere & Company, Moline, IL (US)

(72) Inventors: Ashraf Qadir, Ankeny, IA (US); Qiang Ray Liu, Urbandale, IA (US); Ryan R. White, Polk City, IA (US)

(73) Assignee: DEERE & COMPANY, Moline, IL (US)

( * ) Notice: Subject to any disclaimer, the term of this patent is extended or adjusted under 35 U.S.C. 154(b) by 200 days.

(21) Appl. No.: 18/047,519

(22) Filed: Oct. 18, 2022

(65) Prior Publication Data

US 2024/0126269 A1    Apr. 18, 2024

(51) Int. Cl.
*G05D 1/00* (2024.01)
*A01B 79/00* (2006.01)
*A01D 41/127* (2006.01)

(52) U.S. Cl.
CPC ......... *G05D 1/0251* (2013.01); *A01B 79/005* (2013.01); *A01D 41/127* (2013.01); *G05D 1/0278* (2013.01)

(58) Field of Classification Search
CPC .. G05D 1/0251; G05D 1/0278; A01B 79/005; A01D 41/127; A01D 41/1271
See application file for complete search history.

(56) References Cited

U.S. PATENT DOCUMENTS

| | | |
|---|---|---|
| 8,649,940 B2 | 2/2014 | Bonefas |
| 8,730,233 B2 | 5/2014 | McDaniel et al. |
| 9,053,433 B2 | 6/2015 | Will et al. |
| 9,911,340 B2 | 3/2018 | Samarasekera et al. |
| 10,371,561 B2 | 8/2019 | Darr et al. |
| 10,721,859 B2 | 7/2020 | Wu et al. |
| 10,882,468 B1 | 1/2021 | Czarnecki et al. |
| 2009/0259483 A1 | 10/2009 | Hendrickson et al. |
| 2010/0021052 A1 | 1/2010 | Wellington et al. |
| 2013/0211658 A1 | 8/2013 | Bonefas |

(Continued)

FOREIGN PATENT DOCUMENTS

DE    102021119643 A1    4/2022

OTHER PUBLICATIONS

Extended European Search Report and Written Opinion issued in European Patent Application No. 23193093.4, dated Feb. 26, 2024, in 13 pages.

(Continued)

*Primary Examiner* — Yuen Wong

(57) ABSTRACT

An upper point cloud estimator is configured to estimate a three-dimensional representation of the crop canopy based on collected stereo vision image data. A lower point cloud estimator is configured to estimate a ground three-dimensional representation or lower point of the ground based on the determined average. The electronic data processor is configured to determine one or more differences between the upper point cloud (or upper surface) of the crop canopy and a lower point cloud of the ground, where each difference is associated with a cell within a grid defined by the front region. The electronic data processor is capable of providing the differences to a data processing system to estimate a yield or differential yield for the front region, among other things.

23 Claims, 16 Drawing Sheets

(56) References Cited

U.S. PATENT DOCUMENTS

2019/0124819 A1    5/2019  Madsen et al.
2019/0261560 A1    8/2019  Jelenkovic
2022/0346302 A1*  11/2022  Porth ................... A01B 79/005

OTHER PUBLICATIONS

Snowsat—Peterson Equipment, Snow depth measurement, pp. 1-5 [online]. Retrieved from the Internet <URL: https://petersonequipment.com/snowsat/>.

Canopy Height Models, Digital Surface Models & Digital Elevation Models—Work With LiDAR Data in Python, pp. 1-7 [online]. Retrieved from the Internet <URL: https://www.earthdatascience.org/courses/use-data-open-source-python/data-stories/what-is-lidar-data/lidar-chm-dem-dsm/>.

David Anthony et al., On Crop Height Estimation with UAVs, 2014 IEEE/RSJ International Conference on Intelligent Robots and Systems, Sep. 18, 2014, pp. 4805-4812.

In Situ Height and Width Estimation of Sorghum Plants from 2.5d Infrared Images, University of California, Berkeley, pp. 1-14.

High accuracy topographic mapping based on multiple field operations, 2020 ASABE Annual International Meeting, Jul. 15, 2020, pp. 1-14, https://doi.org/10.13031/aim.20.

* cited by examiner

S200 — Collect stereo vision data to determine, or facilitate determination of, a crop three-dimensional representation or upper point cloud of an upper portion of a crop canopy in a front region in front of the vehicle.

S201 — Estimate a three-dimensional representation of the crop canopy based on collected stereo vision image data.

S202 — Estimate observed ground elevation data based on current observed position data of a location-determining receiver, the current observed position data comprising altitude data and attitude data of the ground associated with the front region.

S203 — Estimate prior ground elevation data and corresponding prior position data, where the location-determining receiver may comprise a global navigation satellite system (gnss) receiver on a first vehicle or an implement mechanically coupled to the vehicle (e.g., first vehicle) comprising a control system.

S303 — Provide, by an imaging device, prior ground elevation data (e.g., of the bare or unplanted soil) associated with the corresponding prior position data.

S204 — Access stored ground elevation data based on a prior position data that aligns with the current observed position data, the prior position data comprising altitude data and attitude data of the ground.

S206 — Determine an average or weighted average of the observed ground elevation and the stored ground elevation for the aligned prior position data and current observed position data.

S207 — Estimate a ground three-dimensional representation or lower point cloud of the ground based on the determined average.

S208 — Transform or align the collected stereo vision data to a common coordinate system of the estimated ground position data.

S210 — Determine one or more differences between the upper point cloud (or upper surface) of the crop canopy and a lower point cloud of the ground, where each difference is associated with a cell (e.g., polygon) within a grid defined by the front region.

S212 — Provide the differences to a data processing system to estimate a yield or differential yield for the front region.

FIG. 2C

S200 — Collect stereo vision data to determine, or facilitate determination of, a crop three-dimensional representation or upper point cloud of an upper portion of a crop canopy in a front region in front of the vehicle.

S201 — Estimate a three-dimensional representation of the crop canopy based on collected stereo vision image data.

S202 — Estimate observed ground elevation data based on current observed position data of a location-determining receiver, the current observed position data comprising altitude data and attitude data of the ground associated with the front region.

S203 — Estimate prior ground elevation data and corresponding prior position data, where the location-determining receiver may comprise a global navigation satellite system (gnss) receiver on a first vehicle or an implement mechanically coupled to the vehicle (e.g., first vehicle) comprising a control system.

S403 — Collect or acquire, by one or more sensors (e.g., range or distance sensors on a boom of a sprayer) prior ground elevation data (e.g., of the bare or unplanted soil) associated with the corresponding prior position data

S204 — Access stored ground elevation data based on a prior position data that aligns with the current observed position data, the prior position data comprising altitude data and attitude data of the ground.

S206 — Determine an average or weighted average of the observed ground elevation and the stored ground elevation for the aligned prior position data and current observed position data.

S207 — Estimate a ground three-dimensional representation or lower point cloud of the ground based on the determined average.

S208 — Transform or align the collected stereo vision data to a common coordinate system of the estimated ground position data.

S210 — Determine one or more differences between the upper point cloud (or upper surface) of the crop canopy and a lower point cloud of the ground, where each difference is associated with a cell (e.g., polygon) within a grid defined by the front region.

S212 — Provide the differences to a data processing system to estimate a yield or differential yield for the front region.

FIG. 2D

METHOD FOR CONTROLLING A VEHICLE FOR HARVESTING AGRICULTURAL MATERIAL

TECHNICAL FIELD

The present disclosure relates to a method for controlling a vehicle for harvesting agricultural material.

BACKGROUND

In some background art, a harvester or vehicle may have sensors that estimate ground elevation or terrain elevation. For example, if the harvester or vehicle is operating on a slope in the direction of travel of the vehicle, the sensor may provide an incorrect estimate of the ground elevation or terrain elevation because of a limited field of view or an inability to distinguish reliably unharvested crop from the ground. Further, the incorrect estimate of ground elevation may not provide a reliable basis for estimating yield of agricultural material in front of the vehicle in the direction of travel. Therefore, there is a need for an improved method for controlling a vehicle for harvesting agricultural material.

SUMMARY

In accordance with one aspect of the present disclosure, a method for controlling a vehicle for harvesting agricultural material in a field or at a worksite comprises collecting stereo vision data to determine a crop three-dimensional representation or upper point cloud of an upper portion (e.g., 3D coordinates of points lying on a top, upper surface, or upper plane) of a crop canopy in a front region in front of the vehicle. An elevation estimator is configured to estimate observed ground elevation data based on current observed position data of a location-determining receiver, the current observed position data comprising altitude data and attitude data of the ground associated with the front region. An electronic data processor is configured to access stored ground elevation data based on prior position data that aligns with the current observed position data, the prior position data comprising altitude data and attitude data of the ground. Further, the elevation estimator is configured to determine an average or weighted average of the observed ground elevation and the stored ground elevation for the aligned prior position data and current observed position data. A lower point cloud estimator is configured to estimate a ground three-dimensional representation or lower point cloud (e.g., ground plane or lower surface lower point cloud of virtual points) of the ground based on the determined average. An electronic data processor is configured to transform or align the collected stereo vision data to a common coordinate system of the estimated ground position data. The electronic data processor is configured to determine one or more differences between the upper point cloud (or upper surface) of the crop canopy and a lower point cloud (or lower surface) of the ground, where each difference is associated with a cell (e.g., polygon) within a grid defined by the front region. The electronic data processor is capable of providing the differences to a data processing system (e.g., crop yield estimator) to estimate a yield or differential yield for the front region.

Other features and aspects will become apparent by consideration of the detailed description, claims, and accompanying drawings.

BRIEF DESCRIPTION OF THE DRAWINGS

The detailed description of the drawings refers to the accompanying figures.

FIG. 2C is a flow diagram of another embodiment of a method for controlling a vehicle for harvesting agricultural material.

FIG. 2D is a flow diagram of yet another embodiment of a method for controlling a vehicle for harvesting agricultural material.

Like reference numerals are used to indicate like elements throughout the several figures.

DETAILED DESCRIPTION

Figure 1:
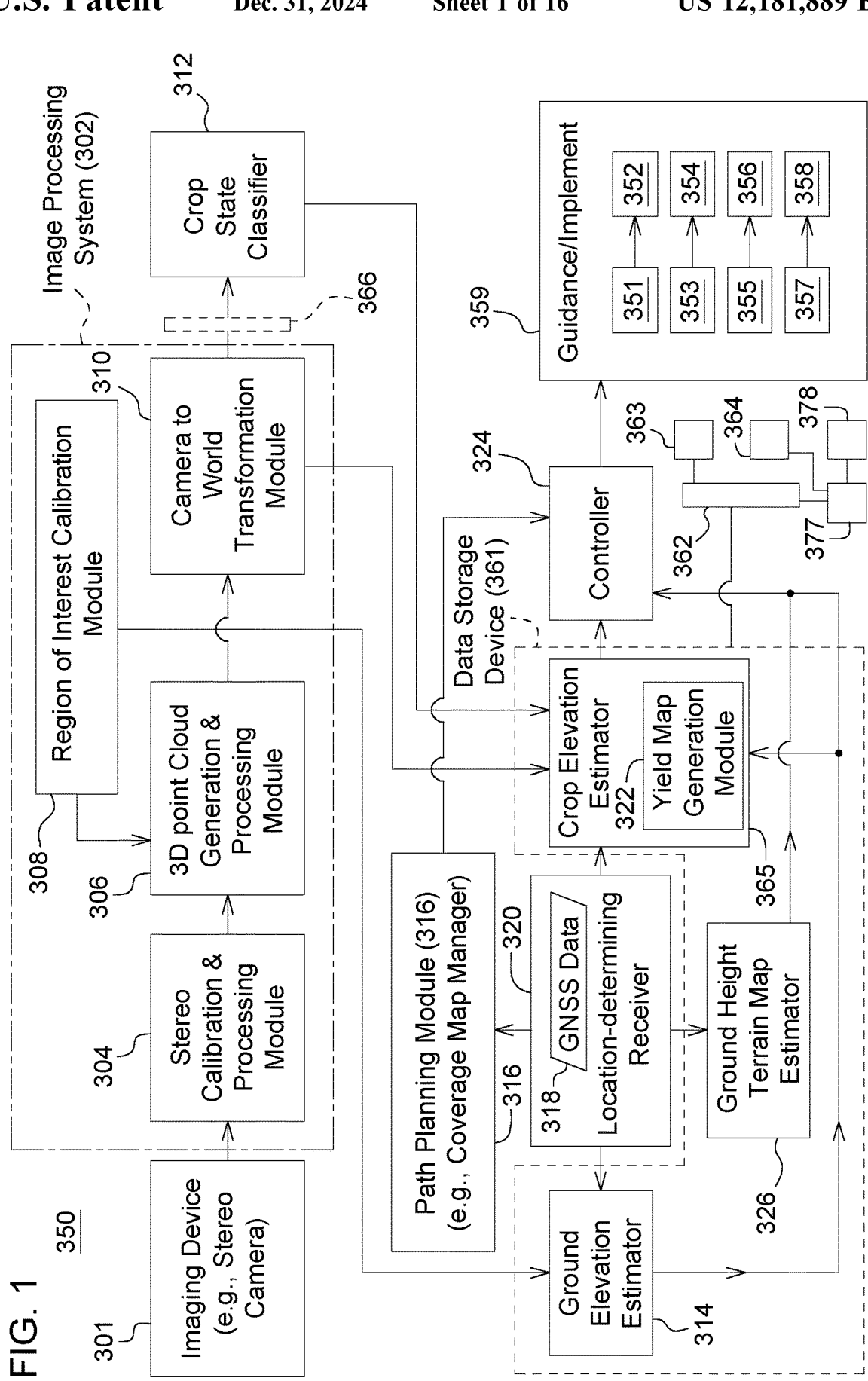
FIG. 1 is a block diagram of one embodiment of a control system for controlling a vehicle for harvesting agricultural material.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally," "substantially" or "approximately" are understood by those of ordinary skill to refer to reasonable ranges outside of a given value or orientation, for example, general tolerances (e.g., plus or minus about ten percent) or positional relationships associated with manufacturing, assembly, and use of the described embodiments.

In accordance with one embodiment, a method for controlling a vehicle 402 for harvesting agricultural material in a field or at a worksite comprises collecting stereo vision data, by one or more imaging devices 301, to determine a crop three-dimensional representation or upper point cloud of an upper portion (e.g., 3D coordinates of points lying on a top, upper surface, or upper plane) of a crop canopy in a front region in front of the vehicle 402. An upper point cloud estimator is configured to estimate a three-dimensional representation of the crop canopy based on collected stereo vision image data. A ground elevation estimator 314 is configured to estimate observed ground elevation data based on current observed position data of a location-determining receiver 320, the current observed position data comprising altitude data and attitude data of the ground associated with the front region.

An electronic data processor 363 is configured to access stored ground elevation data in a data storage device 361 based on a prior position data that aligns with the current observed position data, the prior position data comprising altitude data and attitude data of the ground. Further, the ground elevation estimator 314 is configured to determine an average or weighted average of the observed ground elevation and the stored ground elevation for the aligned prior position data and current observed position data. A lower point cloud estimator is configured to estimate a ground three-dimensional representation or lower point cloud (e.g., ground plane or lower surface lower point cloud of virtual points) of the ground based on the determined average. An electronic data processor 363 is configured to transform or align the collected stereo vision data to a common coordinate system of the estimated ground position data. The electronic data processor 363 is configured to determine one or more differences between the upper point cloud (or upper surface) of the crop canopy and a lower point cloud (or lower surface) of the ground, where each difference is associated with a cell (e.g., polygon or hexagon) within a grid defined by the front region. The electronic data processor 363 is capable of providing the differences to a data processing system (e.g., crop yield estimator) to estimate a yield or differential yield for the front region.

FIG. 1 is a block diagram of one embodiment of a system for controlling a vehicle 402 for harvesting agricultural material. In FIG. 1, an imaging device 301, such as a stereo camera, provides one or more images in a field of interest, such as a sequence of stereo images or one or more monocular images that can be combined to form stereoscopic images. In some embodiments, the field of interest defines any of the following: (a) a generally rectangular region in front of the vehicle 402 in the direction of travel 414, (b) a generally hexagonal region in front of the vehicle 402 in the direction of travel 414, (c) a set of cells, such as adjoining hexagonal cells in front of the vehicle 402 in the direction of travel 414, (d) an upper point cloud, or upper region representative of the crop or plant canopy in front of the vehicle 402 in the direction of travel 414, and (e) a lower point cloud, or lower region, representative of the ground or ground elevation profile in front of the vehicle 402 in the direction of travel 414. The imaging device 301 may provide images within one or more electromagnetic frequency ranges or spectra, such as human visible light, infrared light, near infrared light, ultraviolet light or other electromagnetic frequency ranges.

The imaging device 301 is coupled to an image processing system 302. In one embodiment, the image processing system 302 comprises a stereo calibration-and-processing module 304, cloud-generation-and-processing module 306, a three-dimensional point cloud and generation processing module, a region of interest calibration module 308 and a camera to world transformation module 310.

The stereo-calibration-and-processing module 304 is configured to calibrate the orientation (e.g., angular rotation in two or more dimensions) and alignment (e.g., image rectification) of a first image (e.g., left image) and second image (e.g., right image) of an image pair of one or more collected stereo images. For example, the first image and the second image are aligned to have the same rotational angle in two or more dimensions. In one embodiment, the stereo-calibration-and-processing module 304 is configured to account for distortion (e.g., relative scaling or magnification, and skew) associated with a pair of images (e.g., first image and second image of a pair of images, such as a left image and a right image) that are used in the stereo camera or imaging device 301 because there may be variation (e.g., lens differences or manufacturing tolerances) in the optical system and optical path of the first image and the second image of the imaging device 301. Further, the first image and the second image are aligned (e.g., vertically or longitudinally) to have a common reference frame (e.g., common image plane) of the imaging device 301.

In one configuration, the stereo-calibration-and-processing module 304 is coupled to the (three-dimensional point) cloud-generation-and-processing module 306. The three-dimensional point-cloud-generation-and-processing module 306 is configured to generate a three-dimensional cloud (representing a scene or portion thereof) based on a disparity image that considers the disparity or difference between each (sampled) pixel representing a same viewed object or same observed spatial point in a first image (e.g., left image) and a second image (e.g., right image). For example, the three-dimensional point cloud generation and processing module is configured to generate a lower point cloud, representative of the ground in the region of interest in front of the vehicle (e.g., combine 402) in the direction of travel 414 and to generate an upper point cloud, representative of the crop or plant canopy above the ground in the region of interest. Further, the (three-dimensional) point-cloud-generation-and-processing module 306 or the image processing system 302 generates a successive series of image data (e.g., stereo image data), lower point clouds, upper point clouds, and paired lower and upper point clouds for each sampling interval as the vehicle (e.g., combine 402) traverses its path plan throughout a field or work site.

In one embodiment, the region of interest calibration module 308 is configured to collect image data on or to scan the region of interest in front of the vehicle (e.g., combine 402) in the direction of travel 414 to capture the images or stereo images, where the region of interest may extend laterally based on the width 412 of the vehicle 402, or its implement (e.g., header 404 or cutting bar), or the swath of the vehicle 402. The region of interest calibration module 308 may increase the extent or dimension of the forward-most portion along the longitudinal axis in the direction of travel 414 for the full lateral width 412 of the vehicle 402 or its implement. The region of interest calibration module 308 may optionally be configured to align with the extent of adjoining hexagonal cells.

The camera to world transformation module 310 is configured to transform one or more point clouds (e.g., preliminary three-dimensional point clouds), such as a lower point cloud (representative of the ground) and an upper point cloud (representative of the crop canopy) in the same region of interest, of the common reference frame of the imaging device 301 to (e.g., refined three-dimensional point clouds) in a real world reference frame. The common reference frame of the imaging device 301 may comprise one or more imaging device 301 reference planes or volumetric regions that can be transformed into real world reference frames or real world volumetric regions, for example. The transformation module 310 of the image processing system 302 is coupled to a crop state classifier 312.

In one embodiment, the crop state classifier 312 is configured to determine whether a crop is in a harvested state, a cut state, a stubble state, a unharvested state or growing state or a down-crop state or wind-damaged crop state. For example, the crop state classifier 312 may compare stereo images or refined three-dimensional point clouds of the crop or plants to reference three-dimensional point clouds with known characteristics or known states among the harvested state, a cut state, a stubble state, a unharvested state or growing state or a down-crop state or wind-damaged crop state harvested state, a cut state, a stubble state, a unharvested state or growing state or a down-crop state or wind-damaged crop state. In certain embodiments, the crop state classifier 312 may comprise software instructions for realizing or supporting an artificial intelligence image classification model or algorithm.

In an alternate embodiment, the crop state classifier 312 may comprise a classifier that determines whether a crop or plant is present within a region of interest, or whether the ground is bare, cultivated, fallow or unplanted with crop. However, the boundaries (e.g., external or internal boundaries) of the field or work area may have exclusion zones that the classifier 312 or electronic data processor 363 will no evaluate for crops or plants. The exclusion zones may comprise waterways, swamps, wetlands, gullies, streams, rivers, steep slopes, hazards, treelined areas, brush, obstacles, or field edges, or terrain features, where crops or plants to be harvested or not propagated or grown.

A location-determining receiver 320 may comprise a satellite receiver, a global satellite system navigation receiver (GNSS), or another receiver for estimating a position (e.g., three-dimensional geographic coordinates), attitude (e.g., yaw, roll and pitch angles) or motion data (e.g., velocity and acceleration) associated with the receiver 320, or the vehicle 402 or implement (e.g., boom 54) upon which the location-determining receiver 320 is mounted. In some configurations, the position, attitude or motion data provided or outputted by the location-determining receiver 320 may be referred to as GNSS data 318 or Global Positioning System (GPS) data.

In one example, the location-determining receiver 320 may comprise a GNSS receiver that uses an RTK real-time kinematic reference station to provide correction data or differential carrier phase corrections to estimate or improve estimates of position, attitude or motion data. Further, the location-determining receiver 320 comprises a global navigation satellite system (GNSS) receiver and a wireless device or wireless correction device 364 that operates in a real-time kinematic (RTK) mode and that receives a correction signal from a local or applicable RTK reference station.

In another example, the location-determining receiver 320 may comprise a GNSS receiver (e.g., GPS) that has a wireless device or wireless correction device 364 for receiving correction data (e.g., precise point position (PPP) data) from a satellite or wireless network to augment the estimation of position, attitude and motion. For instance, the location-determining receiver 320 comprises a global navigation satellite system (GNSS) receiver and a wireless device that operates in a precise point positioning (PPP) mode and that receives a (e.g., globally valid) correction signal (e.g., with centimeter-level precision) via wireless correction device 364 from a central data processing system (e.g., central server) associated with a network of satellite receiver reference stations.

In an alternate embodiment, the location-determining receiver 320 may also be associated with one or more accelerometers or dead-reckoning sensors to assist or augment the determination of position, attitude and/or motion data.

In practice, a location-determining receiver 320 can be used to generate the boundaries of the field or worksite by traversing the boundaries of the field or worksite in a survey vehicle 402 prior to harvesting the crop as described in this disclosure. During the harvesting of the crop, as the vehicle 402 traverse the field or work site, the location-determining receiver 320 is configured to provide the position (e.g., geographic coordinates in two or three dimensions), attitude (e.g., roll, pitch and/or yaw angles) and motion data (e.g., velocity). Accordingly, each of the lower point cloud and the upper point cloud, or a pair of lower point cloud and upper point cloud for the region of interest or cells within the field can be indexed or references to the position of the vehicle 402, where the three-dimensional position may include the ground elevation that corresponds to the geographic location of a cell or point with the field in each successive region of interest (which shifts as the vehicle 402 progresses through the field or worksite).

The location-determining receiver 320 is coupled to the path planning module 316, the ground plane estimator, the ground height terrain map estimator 326 and the yield map generation module 322. The location determining receiver can provide ground elevation data, position data, attitude data, and motion data for one or more cells or points within a region of interest, alone or together with the corresponding lower point cloud or upper point clouds that relate to the cells or points within the region of interest.

The ground elevation estimator 314 may comprise an estimator for estimating a lower point cloud, or a ground plane estimator that is configured to estimate a ground plane of the vehicle 402 within the region of interest, such as modeling of a simple ground plane or a complex ground plane with break-lines, curved break-line segments, breaks, slopes or curved slopes, based on the ground elevation data, position data, attitude data, and motion data for one or more cells or points within a region of interest. The ground plane estimator may be modeled as a series of points, straight line segments, curved line segments, or corresponding equations.

The ground height terrain map estimator 326 is configured to estimate the ground elevation of a set of points, a grid of points or one or more cells within the region of interest, alone or in conjunction with the lower point cloud, the upper point cloud, or both. Further, the ground height terrain map estimator 326 may create a ground elevation map or contour elevation map of the entire field or worksite to be stored in a data storage device 361 and references by the current location of the vehicle 402, as the vehicle 402 progresses through the field. For example, the stored ground height terrain map can be accessed to provide a correction or compensation to a ground elevation that is derived from the lower point cloud or collected image data of region of interest. One possible correction or compensation to potential height error 590 in the ground elevation data is set forth in FIG. 5, for instance.

In some embodiments, the ground height terrain may be aligned with, harmonized with or averaged with other sensor observations, such as lower point cloud or stereo image data of the imaging device 301. For example, for one or more cells or points, the lower point cloud may intercept or intersect with ground elevation points that lie on the estimated ground height terrain map or elevation contour map.

The yield map generation module 322 is configured to generate a yield map or estimate a yield that is associated with corresponding regions of interest, cells or zones within the field or work site. For example, the yield map generation module 322 is configured to align pairs of the upper point cloud and the lower point cloud for successive regions of interest or their respective cells; the yield map generation module 322 is configured to determine a difference (e.g., subtract) the upper point cloud and the lower point cloud for successive regions of interest or their respective cells to estimate a corresponding plant volume, plant biomass, crop yield, or plant height cloud for successive regions of interest or their respective cells.

An electronic data processor 363 may comprise a microprocessor, a microcontroller, a programmable logic array, a field-programmable gate array (FPGA), a logic device, a digital signal processor (DSP), an application specific integrated circuit (ASIC), a system on chip (SOC), or another data processor for storing, processing and/or manipulating data.

A data storage device 361 comprises electronic memory, non-volatile electronic memory, random access memory, optical storage devices, magnetic storage devices, hard disk drives, or other devices for storing, retrieving, reading, writing and accessing data.

The data port(s) 377 may comprise input/output data ports, such as a communications line transceiver (e.g., universal asynchronous receiver/transmitter (UART), universal serial bus (USB) interface, serial or parallel data port).

The electronic data processor 363 is coupled to a data bus 362 to support communication, execution of software instructions and processing of data associated with the data storage device 361 and the data port(s) 377.

The ground elevation estimator 314, the ground height terrain map estimator 326, the crop elevation estimator 365, and yield map generation module 322 may comprise software instructions, associated data libraries, or other software components that are stored in the data storage device 361 and that are executable by the electronic data processor 363, the controller 324 or both. The image processing system 302 may have one or more additional electronic data processors and data storage devices for supporting execution of software instructions in the modules of the image processing system 302. Further, in certain configurations, the modules may comprise software components, hardware components, or a combination of software and hardware components, such as digital logic systems, or the like.

In an alternate embodiment, the path planning module 316 may comprise software instructions, associated data libraries, or other software components that are stored in the data storage device 361 and that are executable by the electronic data processor 363, the controller 324, or both.

The yield map generation module 322 or crop elevation estimator 365, or both, may provide any of the following yield-related data to the controller 324 (e.g., vehicle controller 324 or implement controller 357): the estimated corresponding plant volume, plant biomass, crop yield, or plant height cloud for successive regions of interest or their respective cells. In response to the estimated yield-related data, the controller 324 can generate control signals to regulate or optimize the machine settings of the vehicle 402 (e.g., combine or harvester), such as a ground speed or variation of the ground speed, correction data to the header 404 height adjustment to track the estimated ground elevation or ground plane, adjustment of rotor speed or threshing speed settings of the thresher, cleaning fan speed or the like.

Figure 5:
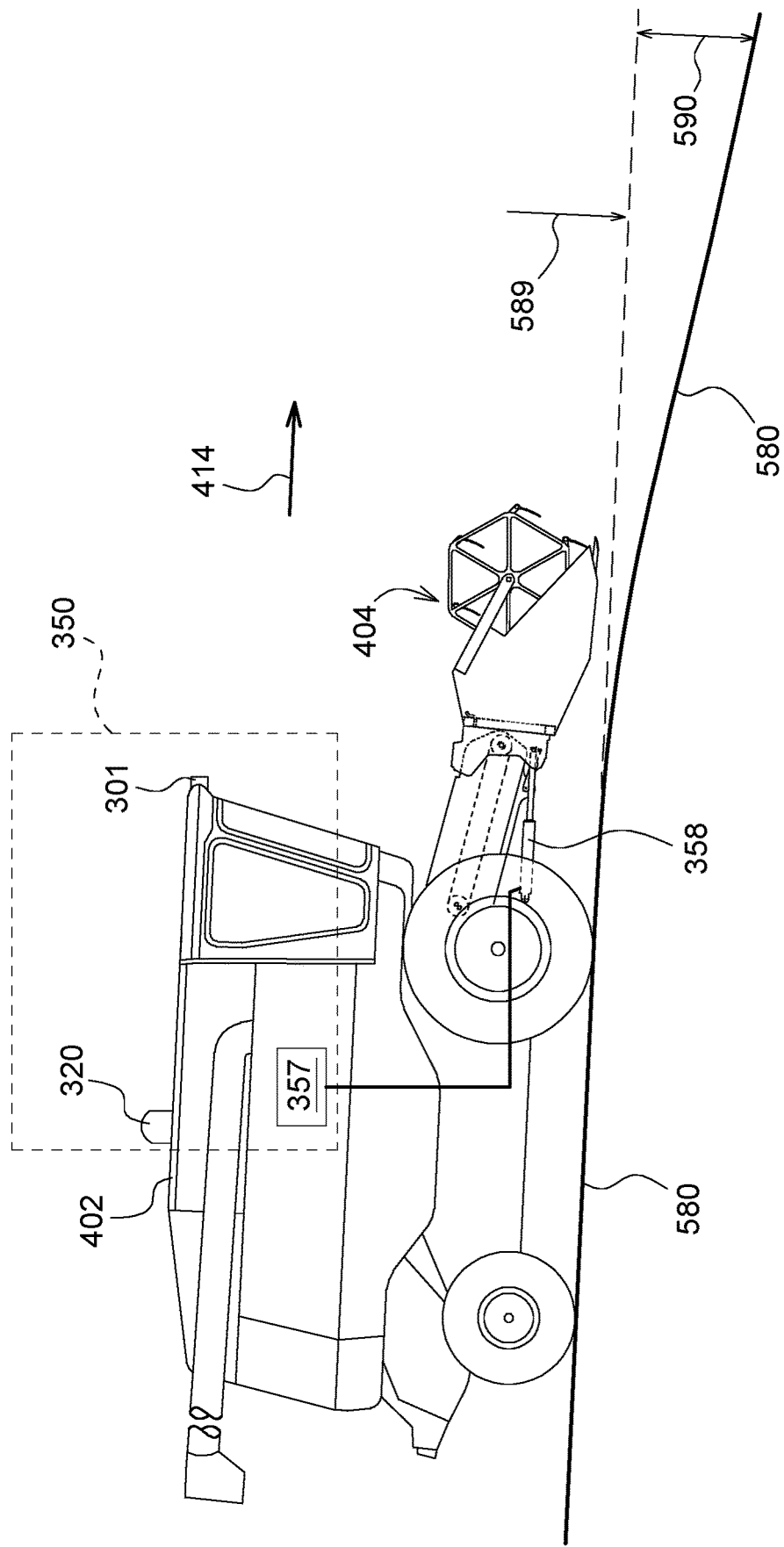
FIG. 5 illustrates a side view of a vehicle and a potential ground elevation error associated with the sensor in the direction of travel of the vehicle.

The controller 324 is coupled to a guidance/implement module. The guidance/implement system 359 comprises a steering controller 351 coupled to a steering system 352; a braking controller 355 coupled to a breaking system, a propulsion controller 353 coupled to a propulsion system 354 and an implement controller 357 coupled to an implement system 358. The implement system 358 may comprise an implement actuator (e.g., an electrohydraulic cylinder to adjust header height, header roll angle and/or heard tilt angle, as illustrated in FIG. 5), where implement actuator may further an electric motor, an electrohydraulic system or other actuator that is configured to control the header height of the header with respect to the ground below it and/or in the front region, rotor or threshing speed, and cleaning fan speed. The steering system 352 may comprise a rack and pinion steering system, an electrohydraulic steering system, an Ackerman steering system, an electric motor-assisted power steering system, or the like. The braking system 356 may comprise an electrohydraulic braking system, a cable actuated breaking system or an electrically actuated breaking system. The propulsion system 354 may comprise an internal combustion engine, alone or in conjunction with a drive train, which is controlled by an engine control module, or vehicle 402 control module. Alternately, the propulsion system 354 may comprise a hybrid system that comprises an internal combustion engine in combination with an electric machine and energy storage device (e.g., batteries). In other alternative configurations, the propulsion system 354 may comprise a set of electric traction drives and an energy storage device, and an energy management system.

The path planning module 316 is configured to determine a path plan of a vehicle 402 or to guide the vehicle 402, via the guidance/implement module, in accordance with a programmed or established path plan. The path planning module 316 may determine a path plan to harvest one or more zone of a field or work area, or an entire work area. For example, the path planning module 316 may determine a path plan to harvest one or more zone of a field or work area, or an entire work area, depending upon the estimated yield-related data of the yield map generation module 322.

Figure 2A:
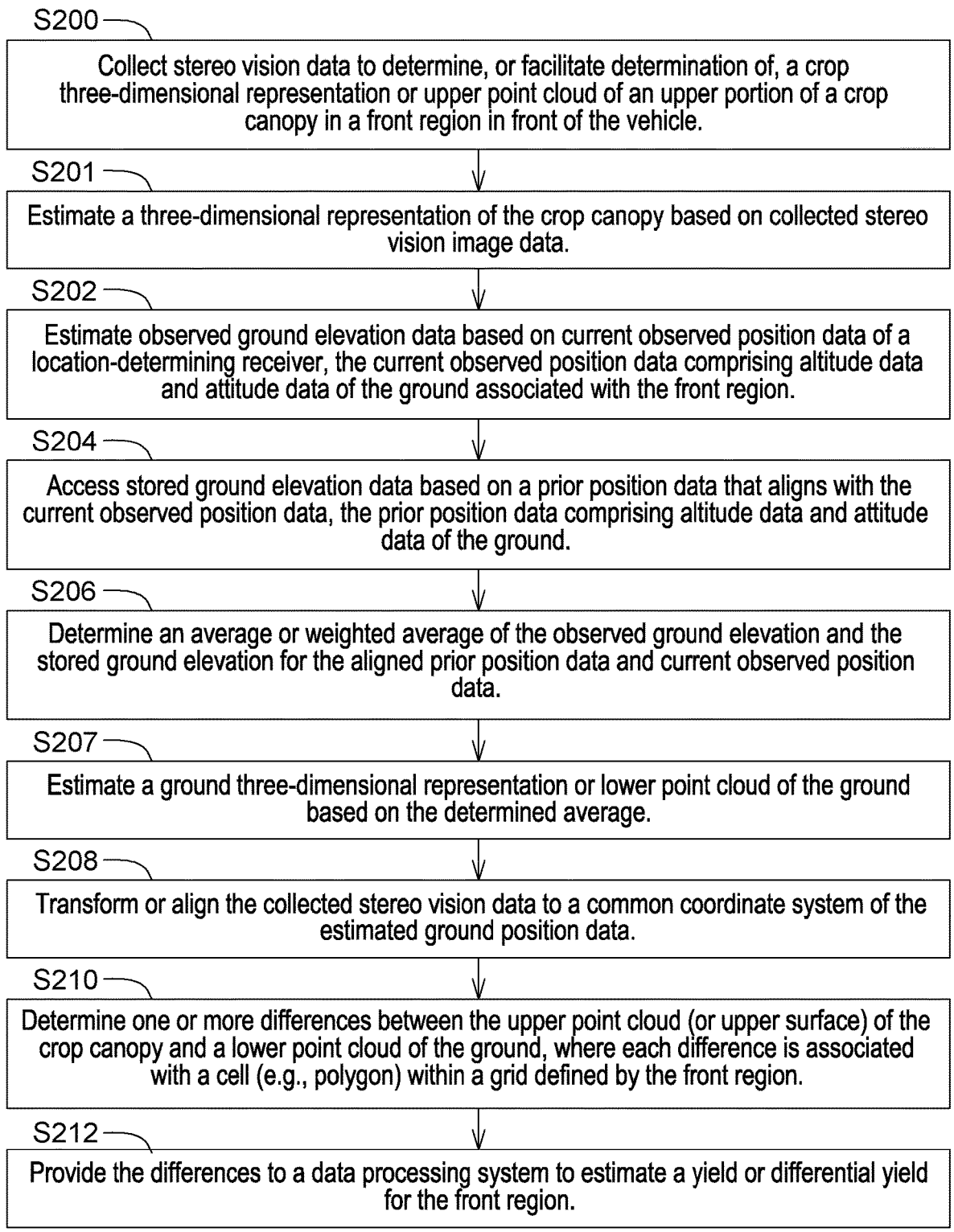
FIG. 2A is a flow diagram of one embodiment of a method for controlling a vehicle for harvesting agricultural material.

FIG. 2A illustrates a flow chart of one embodiment of a method for controlling a vehicle 402 for harvesting agricultural material in a field or at a worksite. The method of FIG. 2A beings in step S200.

In step S200, one or more imaging devices are configured to collect stereo vision data to determine, or facilitate determination of, a crop three-dimensional representation or upper point cloud of an upper portion (e.g., 3D coordinates of points lying on a top, upper surface, or upper plane) of a crop canopy in a front region (e.g., field of interest) in front of the vehicle 402. For example, the front region may comprise a field of interest within a line-of-site path or line-of-site scan of the imaging system.

In step S201, a 3D point cloud generation and processing module, an estimator, an upper point cloud estimator, or an electronic data processor 363 is configured to estimate a three-dimensional representation of the crop canopy based on collected stereo vision image data.

In step S202, a ground elevation estimator 314 is configured to estimate observed ground elevation data based on current observed position data of a location-determining receiver 320, the current observed position data comprising altitude data and attitude data of the ground associated with the front region. For example, the ground elevation estimator 314 may estimate a ground plane.

In step S204, an electronic data processor 363 or ground height terrain map estimator 326 is configured to access stored ground elevation data (e.g., in a data storage device 361 on the vehicle 402, or in cloud data storage accessible via a wireless communications transceiver that operates on a communications channel of a wireless network) based on a prior position data that aligns with the current observed position data, the prior position data comprising altitude data and attitude data of the ground.

In step S206, the ground elevation estimator 314 or the electronic data processor 363 is configured to determine an average or weighted average of the observed ground elevation and the stored ground elevation for the aligned prior position data and current observed position data.

In step S207, the ground elevation estimator 314, a lower point cloud estimator, or an electronic data processor 363, is configured to estimate a ground three-dimensional representation or lower point cloud (e.g., ground plane or lower surface lower point cloud of virtual points) of the ground based on the determined average.

Steps S207, alone or together with step S202, may be executed in accordance with various examples, which may be applied separately or cumulatively. Under first example, in step S202 the attitude data comprises roll angle data associated with a vehicle; in step S207 the ground cloud data is adjusted to account for the roll data of step S207 over a vehicle width 412 or swath or for a roll-adjusted ground region between the vehicle wheels (or tracks). Under a second example, in step S202, the attitude data comprises roll angle, pitch angle, and heading angle data associated with the vehicle; in step S207 wherein the ground cloud data is adjusted to account for the pitch data for a pitch-adjusted ground region between the front wheel and the rear wheel (or between front and rear vehicle tracks) or a pitch-adjusted ground region between a vehicle front and vehicle rear is adjusted to account from the pitch angle.

In step S208, an electronic data processor 363 or a transform module is configured to transform or align the collected stereo vision data to a common coordinate system. For example, a camera to world transformation module is configured to transform or align the collected stereo vision data to a common coordinate system of any of the following: the upper point cloud, the lower point cloud, and the estimated ground position data In step S210, the yield map generation module 322, electronic data processor 363 or volumetric difference estimator is configured to determine one or more differences between the upper point cloud (or upper surface) of the crop canopy and a lower point cloud (or lower surface) of the ground. For instance, the yield map generation module 322, electronic data processor 363 or volumetric difference estimator is configured to determine one or more differences between the upper point cloud (or upper surface) of the crop canopy and a lower point cloud (or lower surface) of the ground, where each difference is associated with a region, a zone, or a cell (e.g., polygon or hexagon) within a grid defined by the front region (e.g., region of interest).

Step S210 may be executed in accordance with various techniques, which may be applied separately or cumulatively. Under a first technique for executing step S210, the electronic data processor 363, yield map generation module 322, or a crop elevation estimator 365 the upper surface and lower surface are divided into a set of cells (e.g., hexagonal or polygonal) associated with the front region, where an upper boundary of an upper cell of the upper surface can be projected downward to the corresponding lower boundary of a lower cell of the lower surface or where a lower boundary of a lower cell of the lower surface can be projected upward to the corresponding upper boundary of an upper cell of the upper surface. Under a second technique for executing step S210, the electronic data processor 363, yield map generation module 322, or a crop elevation estimator 365, are configured to align or associate points lying on the cell boundaries to have pairs of equal x-y plane coordinates, with different z coordinates. Under a third technique, the yield map generation module 332 or the electronic data processor 363, or the crop elevation estimator 365 is configured to estimate or determine the differential yield by determining the difference between the crop height and ground elevation to estimate yield or volume or mass of plant material to be harvested by combine or harvester within one or more cells or zones, such as cells in a front region or region of interest of the combine 402 or harvester.

In step S212, the yield map generation module 322, electronic data processor 363 or the yield estimator is capable of providing the differences to estimate a yield or differential yield for the front region (e.g., region of interest, cells, regions or zones). For example, the yield map generation module 322, electronic data processor 363 or the yield estimator is capable of providing the differences to a data processing system (e.g., crop yield estimator) to estimate a yield or differential yield for the front region e.g., region of interest, cells, regions or zones).

Step S212 may be carried out in accordance with various procedures, which may be applied separately or cumulatively. Under a first procedure, the electronic data processor 363, the crop elevation estimator 365, or the yield map generation module 322 is configured to determine a corresponding three dimensional volume an upper-lower cell pair between an upper boundary and a lower boundary is indicative of the yield or vigor of plants or crops in the cell. Under a second procedure, the electronic data processor 363, the crop elevation estimator 365, or the yield map generation module 322 is configured to determine the average, mean, median or mode of a difference between the upper height for a corresponding upper cell and the lower height for a lower cell is indicative of the yield or vigor of plants or crops in the cell. Under a third procedure, the electronic data processor 363, the crop elevation estimator 365, or the yield map generation module 322 is configured to determine or estimate an aggregate yield of cells within the front region that can be used to adjust the combine 402 or harvester settings, and to calibrate or supplement a yield detected by the yield monitoring during a time interval. Under a fourth procedure, the electronic data processor 363, the crop elevation estimator 365, or the yield map generation module 322 is configured to determine or estimate an aggregate yield of cells within the front region; and to apply the estimated aggregate yield of cells within the front region to adjust the combine or harvester settings (e.g., of the combine 402) and to calibrate or supplement a yield detected by the yield monitoring device during a time interval. Under a fifth procedure, the electronic data processor 363, the crop elevation estimator 365, or the yield map generation module 322 is configured to determine or estimate an aggregate yield of cells within an entire field region, wherein the estimated aggregated yield may be used estimate the yield of the crop, alone or together with observed measurements of a yield monitor or yield monitoring device, such as an impact plate yield monitor associated with a piezoelectric element and/or an ultra-high frequency (UHF) or microwave sensor for measuring crop moisture and density in or near a clean elevator assembly of a combine 402.

Figure 2B:
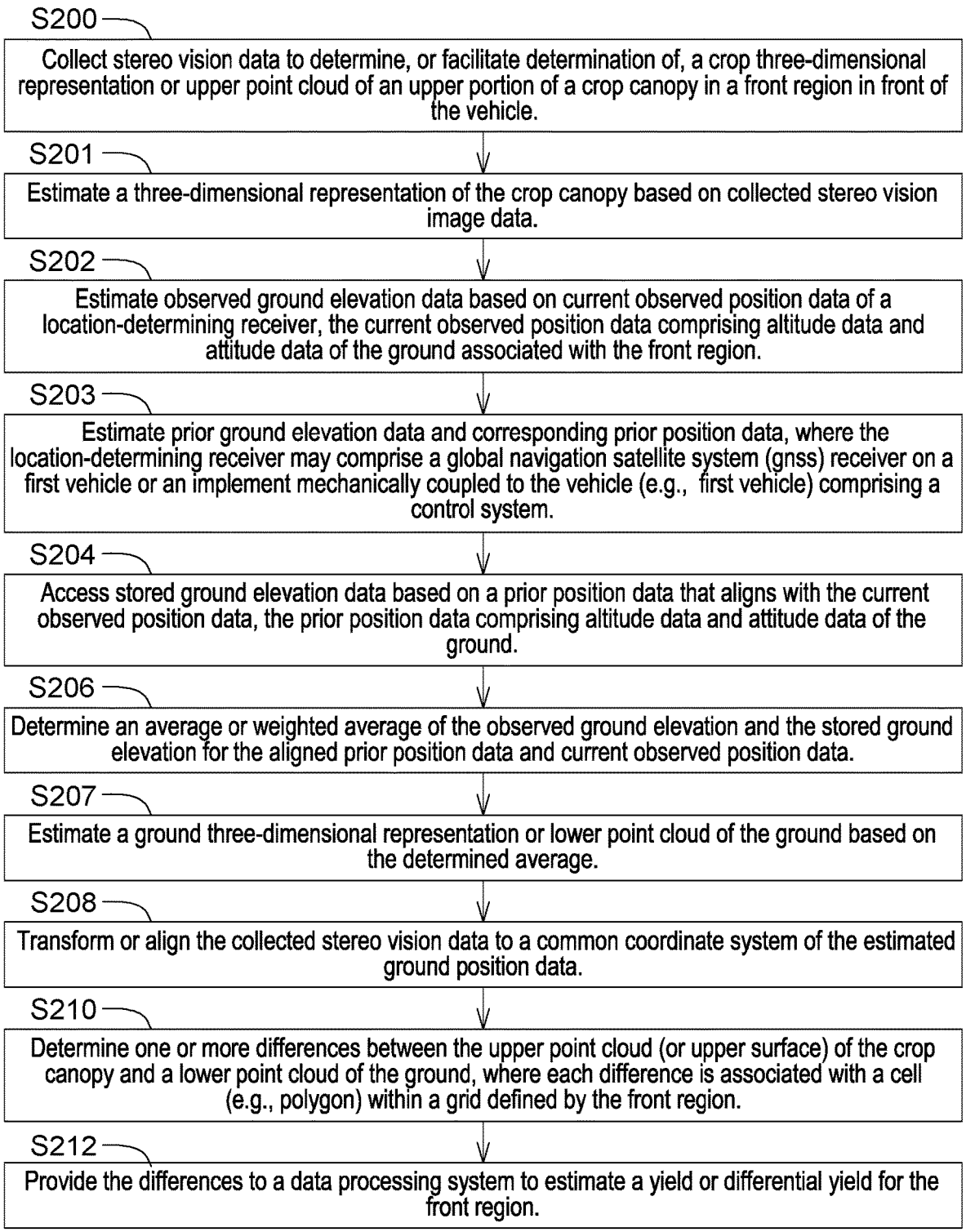
FIG. 2B is a flow diagram of one embodiment of a method for controlling a vehicle for harvesting agricultural material.

FIG. 2B illustrates a flow chart of another embodiment of a method for controlling a vehicle 402 for harvesting agricultural material in a field or at a worksite. The method of FIG. 2B is similar to the method of FIG. 2A, except FIG. 2B further comprises step S203.

In step S203, the location-determining receiver 320 is configured to estimate prior ground elevation data and corresponding prior position data, where the location-determining receiver 320 may comprise a global navigation satellite system (GNSS) receiver on a first vehicle or an implement mechanically coupled to the vehicle (e.g., first vehicle) comprising a control system 350. The vehicle or the first vehicle may comprise a harvester or combine 402 from a prior growing season or year, a sprayer 62 at a first time (t)), or another agricultural vehicle capable of planting, tilling, cultivating, or treating soil or plants. Further, the ground elevation estimator 314 or the electronic data processor 363 of the control system 350 of the vehicle (e.g., first vehicle) is configured to record or store, in a data storage device (361, 905) or in cloud data storage 903 the prior ground elevation data associated with corresponding prior position data of a vehicle or an implement mechanically coupled to the vehicle that is performing an agricultural task (e.g., prior agricultural task in the same or prior growing season, distinct from a current agricultural task in a respective current growing season) in the field or at the worksite.

The first vehicle, or its implement can be configured to perform an agricultural task that comprises planting, cultivating, tilling, seeding, treating, irrigating, or spraying that is earlier in the same growing season or a prior growing season (e.g., with respect to harvesting).

FIG. 2C illustrates a flow chart of yet another embodiment of a method for controlling a vehicle 402 for harvesting agricultural material in a field or at a worksite. The method of FIG. 2C is similar to the method of FIG. 2A, except FIG. 2C further comprises step S203 and S303.

In step S203, the location-determining receiver 320 is configured to estimate prior ground elevation data and corresponding prior position data, where the location-determining receiver 320 may comprise a global navigation satellite system (GNSS) receiver on a first vehicle or an implement mechanically coupled to the vehicle (e.g., first vehicle) comprising a control system 350. The vehicle or the first vehicle may comprise a harvester or combine 402 from a prior growing season or year, a sprayer 62 at a first time (t)), or another agricultural vehicle capable of planting, tilling, cultivating, or treating soil or plants. Further, the ground elevation estimator 314 or the electronic data processor 363 of the control system 350 of the vehicle (e.g., first vehicle) is configured to record or store, in a data storage device (361, 905) or in cloud data storage 903 the prior ground elevation data associated with corresponding prior position data of a vehicle or an implement mechanically coupled to the vehicle that is performing an agricultural task (e.g., prior agricultural task in the same or prior growing season, distinct from a current agricultural task in a respective current growing season) in the field or at the worksite.

The first vehicle, or its implement can be configured to perform an agricultural task that comprises planting, cultivating, tilling, seeding, treating, irrigating, or spraying that is earlier in the same growing season or a prior growing season (e.g., with respect to harvesting).

In step S303, an imaging device 301 (e.g., a stereo vision imaging device), on vehicle (e.g., first vehicle for performing tillage, planting, seeding, or spraying), is configured to provide prior ground elevation data (e.g., of the bare or unplanted soil) associated with the corresponding prior position data. The imaging device 301 of the control system 350 of the vehicle (e.g., first vehicle) may provide supplemental ground elevation data, derived from direct observation of the bare soil or derived from images of the plant canopy, such as from an upper point cloud representative of the plant canopy as a sprayer 62 traverses the field or work area prior to a harvesting operation of the harvester 402 in the same growing season or a different growing season for the same field or work area.

In one configuration, an image processing system 302 or transformation module 3110 is configured to map, translate, associate or organize an initial coordinate reference frame the prior ground elevation data of the stereo imaging device to a common coordinate reference frame of the location-determining receiver 320.

The prior ground elevation data from steps S203 and S303 can comprise the stored ground elevation data that is available for processing in step S204 or other steps in FIG. 2A, FIG. 2C, or other methods disclosed in this document. Accordingly, in step S305, the electronic data processor of the control system of the vehicle (e.g., first vehicle) is configured to record, store, in a data storage device (361, 905) or cloud data storage 903 the prior ground elevation data associated with corresponding prior position data of a vehicle or an implement mechanically coupled to the vehicle that is performing an agricultural task in the field or at the worksite.

FIG. 2D illustrates a flow chart of yet another embodiment of a method for controlling a vehicle 402 for harvesting agricultural material in a field or at a worksite. The method of FIG. 2D is similar to the method of FIG. 2A, except FIG. 2D further comprises step S203 and S403.

In step S203, the location-determining receiver 320 is configured to estimate prior ground elevation data and corresponding prior position data, where the location-determining receiver 320 may comprise a global navigation satellite system (GNSS) receiver on a first vehicle or an implement mechanically coupled to the vehicle (e.g., first vehicle) comprising a control system 350. The vehicle or the first vehicle may comprise a harvester or combine 402 from a prior growing season or year, a sprayer 62 at a first time (t)), or another agricultural vehicle capable of planting, tilling, cultivating, or treating soil or plants. Further, the ground elevation estimator 314 or the electronic data processor 363 of the control system 350 of the vehicle (e.g., first vehicle) is configured to record or store, in a data storage device (361, 905) or in cloud data storage 903 the prior ground elevation data associated with corresponding prior position data of a vehicle or an implement mechanically coupled to the vehicle that is performing an agricultural task (e.g., prior agricultural task in the same or prior growing season, distinct from a current agricultural task in a respective current growing season) in the field or at the worksite.

The first vehicle, or its implement can be configured to perform an agricultural task that comprises planting, cultivating, tilling, seeding, treating, irrigating, or spraying that is earlier in the same growing season or a prior growing season (e.g., with respect to harvesting).

In step S403, one or more sensors 61 (e.g., range or distance sensors), which are positioned or mounted on a boom 54 of a sprayer vehicle 62, collect or acquire prior ground elevation data (e.g., of the bare or unplanted soil) associated with the corresponding prior position data. For example, the sensors 61 are used with the control system 350 of the vehicle (e.g., first vehicle) to provide supplemental ground elevation data, derived from any of the following: (a) a ground distance 66, a plant distance 70, or both; (b) direct observation of the bare soil or derived from images of the plant canopy, such as from an upper point cloud representative of the plant canopy; and/or (c) range or distance measurements of the sensors 61 as a sprayer 62 traverses the field or work area prior to a harvesting operation of the harvester 402 in the same growing season or a different growing season for the same field or work area. Each sensor 61 along the boom 54 may provide a different observation of the ground distance 66, the plant distance 70, or both along the lateral direction of the boom, particularly where the ground is not substantially planar or where the ground has roll angle associated with one or both lateral sides (e.g., right side or left side) of the boom 54.

In one configuration, an image processing system 302 or transformation module 310 is configured to map, translate, associate or organize an initial coordinate reference frame the prior ground elevation data of the sensors 61 to a common coordinate reference frame of the location-determining receiver 320.

The prior ground elevation data from steps S203 and S403 can comprise the stored ground elevation data that is available for processing in step S203, step S403 or other steps in FIG. 2A, FIG. 2C, or other methods disclosed in this document. Accordingly, in step S305, the electronic data processor 363 of the control system of the vehicle (e.g., first vehicle) is configured to record, store, in a data storage device (361, 905) or cloud data storage 903 the prior ground elevation data associated with corresponding prior position data of a vehicle (e.g., sprayer 62) or an implement (e.g., combination of boom 54, nozzles 60, tank 65, pump, and hydraulic lines) mechanically coupled to the vehicle (e.g., sprayer 62) that is performing an agricultural task in the field or at the worksite.

Figure 2E:
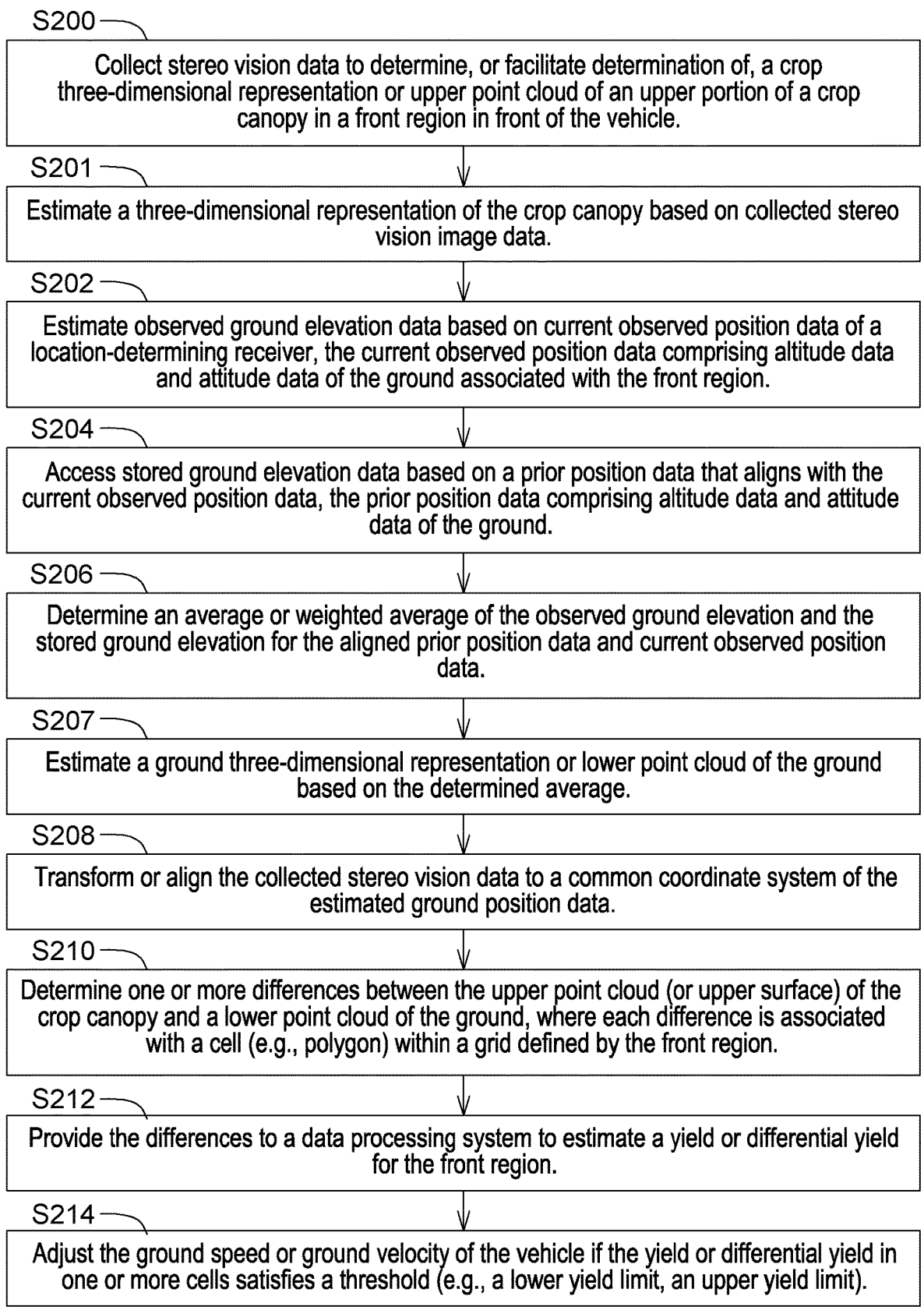
FIG. 2E is a flow diagram of still another embodiment of a method for controlling a vehicle for harvesting agricultural material.

FIG. 2E illustrates a flow chart of still another embodiment of a method for controlling a vehicle 402 for harvesting agricultural material in a field or at a worksite. The method of FIG. 2E is similar to the method of FIG. 2A, except FIG. 2E further comprises step S214.

In step S214, a controller 324 or a propulsion controller 35, which communicates with the guidance/implement system 359 or the propulsion system 354, is configured to adjust the ground speed or ground velocity of the vehicle if the yield or differential yield in one or more cells satisfies a threshold (e.g., a lower yield limit, an upper yield limit). Step S214 may be carried out in accordance with various techniques, which may be applied separately or cumulatively. Under a first technique, a controller 324, or a propulsion controller 353 communicates with the guidance/implement system 359 or the propulsion system 354 to adjust or increase the ground speed or ground velocity of the vehicle if the yield or differential yield in one or more cells is less than a threshold yield or upper yield limit. Under a second technique, a controller 324, or a propulsion controller 353 communicates with the guidance/implement system 359 or the propulsion system 354 to adjust or decrease the ground speed or ground velocity of the vehicle if the yield or differential yield in one or more cells is greater than a threshold yield or lower yield limit. Under a third technique, a controller 324, or a propulsion controller 353 communicates with the guidance/implement system 359 or the propulsion system 354 to determine differential settings of vehicle speed, velocity or the like related to harvesting of the crop associated with the front region. Under a fourth technique, a controller 324, or a propulsion controller 353 communicates with the guidance/implement system 359 or the propulsion system 354 to adjust (e.g., increase, decrease or maintain) the speed or velocity of the vehicle (e.g., for a sampling interval) to maintain a target throughput, volume, mass or output of harvested crop or harvested plant material per unit of time based on estimated yield or differential yield in one or more cells or crop in the front region.

Figure 3:
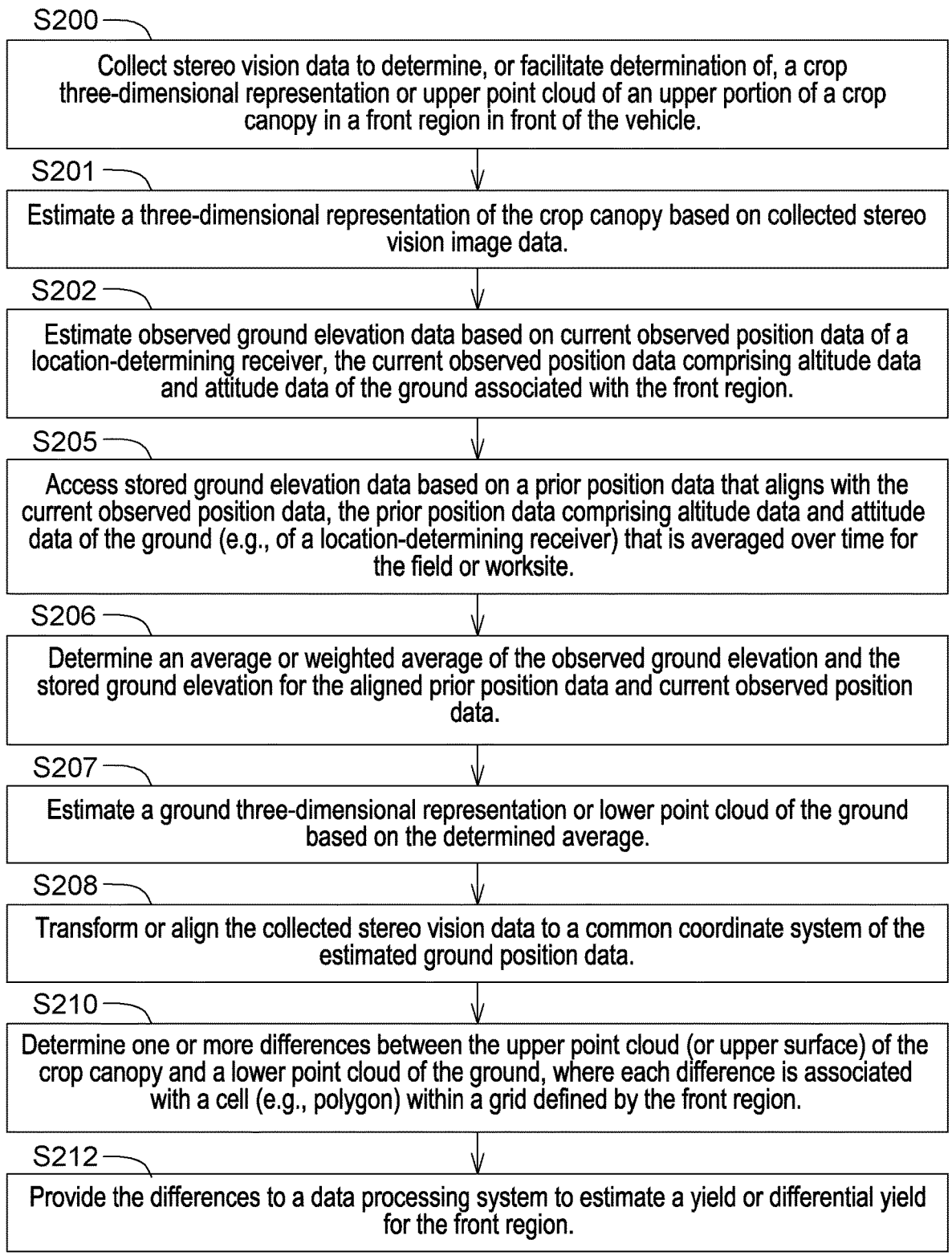
FIG. 3 is a flow diagram of another embodiment of a method for controlling a vehicle for harvesting agricultural material.

FIG. 3 illustrates a flow chart of one embodiment of a method for controlling a vehicle 402 for harvesting agricultural material in a field or at a worksite. The method of FIG. 3 beings in step S200. Like reference numbers in FIG. 2A and FIG. 3 indicate like method, steps or procedures.

The method of FIG. 3 is similar to the method of FIG. 2A, except the method of FIG. 3 replaces step S204 with step S205.

In step S205, which may occur simultaneously with step S202 or after step S202, the electronic data processor 363 or ground height terrain map estimator 326 accesses stored ground elevation data based on prior position data that aligns with the current observed position data, the prior position data comprising altitude data and attitude data of the ground (e.g., of a location-determining receiver 320) that is averaged over time for the field or worksite.

Figure 4A:
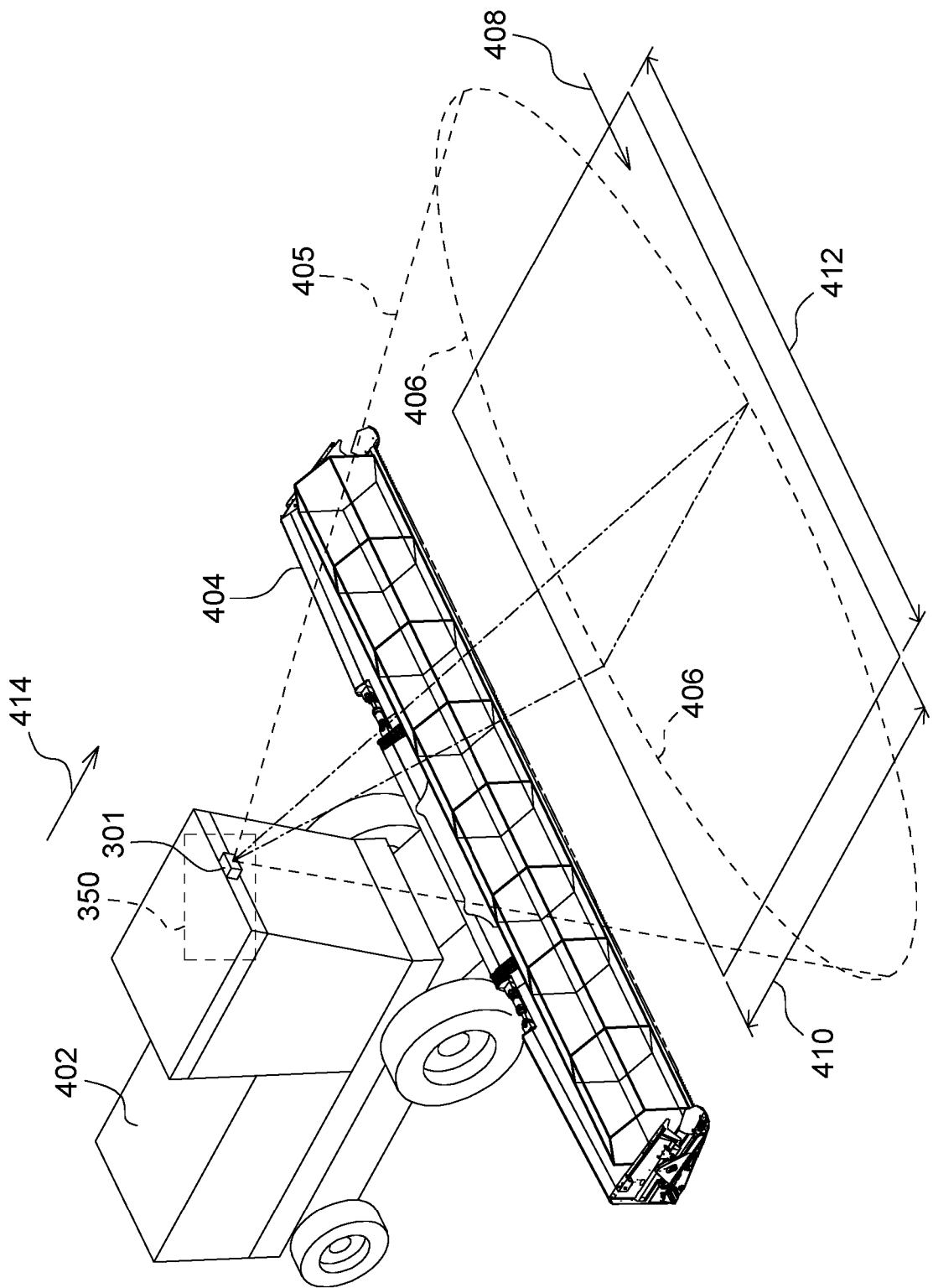
FIG. 4A illustrates one embodiment of a vehicle (e.g., combine or harvester) with a sensor for estimating an upper point cloud of a crop canopy in a field of interest (e.g., generally rectangular field of interest) in the direction of travel of the vehicle, or a lower point cloud of the ground in the field of interest, or both.

FIG. 4A illustrates one embodiment of a vehicle 402 (e.g., combine or harvester) with a sensor for estimating an upper point cloud of a crop canopy in a field of interest (e.g., generally rectangular field of interest) in the direction of travel 414 of the vehicle 402, or a lower point cloud of the ground in the field of interest, or both. The vehicle 402 comprises a header 404 for harvesting (e.g., cutting and gathering) a crop, such as grain, corn, maize, small seed grain, soybeans, soya beans, or beans. The vehicle 402 comprises an imaging system (e.g., stereo camera) and system for controlling a vehicle 402 for harvesting of crop, such the system of FIG. 1. The imaging system collects a sequence of one or more images, such as pairs of stereo image data of a first image (e.g., left image) and a second image (e.g., right image) of the field of interest or front region in front of the vehicle 402 in the direction of travel 414. The stereo vision system may operate in the human visible light frequency range or corresponding wavelength range, in the infrared or near infrared frequency range or corresponding wavelength range, in the ultraviolet frequency or corresponding wavelength range to collect image data on the upper point cloud, the lower point cloud or both.

In one embodiment, the image processing system 302 or control system 350 may comprise a color discrimination module 366, alone or in combination with an object edge detector, to detect or identify pixels of the image data. For example, color discrimination module 366, alone or in combination with an object edge detector, are configured to distinguish plant pixels or crop pixels from background pixels, such as the sky, buildings, other vehicles, treelined areas, fences, roads, or other vegetation, or obstructions. Further, in some embodiments, the image processing system 302 or color discrimination module 366 pixels, is configured to process collected image data (e.g., stereo images or disparity images) to identify or distinguish any of the following pixels or voxels: (a) ground pixels or voxels from plant pixels or plant voxels, or (b) background pixels or voxels, (c) ground pixels, plant pixels and background pixels, (d) to identify three-dimensional points or ground pixels or ground voxels of the lower point cloud, and (e) to identify three-dimensional points or plant pixels or plant voxels of the upper point cloud of the crop canopy. However, the location-determining receiver 320 may store and/or retrieve ground elevation data (e.g., altitude and attitude data) to estimate the lower point cloud that is aligned with an upper point cloud within the same front region in the direction of travel 414 of the combine, or with the same field of interest.

In an alternate embodiment, a supplemental ultrasonic scanning sensor, or a crop-penetrating radar system, or a LIDAR (light-detection-and-ranging) system is integral with the imaging device or located adjacent to the imaging device. Further, the supplemental ultrasonic scanning sensor, or a crop-penetrating radar system, or a LIDAR system may be used to establish additional 3D points on the ground (e.g. a ground plane to the extent the ground is substantially planar), such as the lower point cloud. A LIDAR system may comprise a range finder that determines a range or distance (or distance and bearing) between an object and the LIDAR system. Similarly, a radar system or radio detection and ranging system may detect a time delay between a transmitted electromagnetic signal pulse and reception of a reflected electromagnetic signal pulse (derived from the transmitted electromagnetic signal pulse) to estimate the distance or range between the radar system and an object, to estimate the distance and bearing between the radar system and the object, and/or to estimate the distance, bearing and velocity of the object with respect to the radar system. In the context of LIDAR, radar or range finder, the object may comprise crop, plant, the ground or any other object, for example. A radar or LIDAR device can be directed toward the front region of ground in front the vehicle to provide potential adjustments or augmentation of the ground elevation data versus position or geographic coordinates of ground point clouds.

As illustrated in FIG. 4A, the front region or field or interest comprises a generally rectangular region, which defines a length 410 and a width 412. The length 410 (or longitudinal dimension) is generally parallel to the direction of travel 414 of the vehicle 402, whereas the width 412 (or lateral dimension 408) is generally perpendicular to the direction of drive of the vehicle 402. The imaging system may tend to have a substantially oval coverage pattern 406 (which is bounded by an imaging boundary 405) for collection of the image data, such stereo image data, such that multiple samples of image pairs during one or more sampling intervals are spatially aligned or stitched together to produce image data that covers the generally rectangular region or field of interest. In certain embodiments, the entire ground surface of the field may be divided into (adjoining) rectangular regions or cells, where each cell has a ground elevation, such as an average, mean, or mode ground elevation, alone or together with an optional slope indicator, such as substantially planar, a (dominant) pitch slope angle and/or a (dominant) roll slope angle, or a (dominant) compound pitch slope angle and roll slope angle. As provided or collected by the location-determining receiver 320, the ground surface, cell data, and/or lower point cloud data of the field may be recorded and/or stored in a data storage device 361 or in a cloud data storage, or central server for later access by the vehicle 402, via a wireless device operating over a wireless network, for later growing seasons, as a vehicle 402 traverses the same field or work area with the ground surface, which may be stable over different growing seasons or erode over time with exposure to wind, precipitation, erosion, and other natural or manmade conditions.

In some embodiments, each cell (e.g., substantially rectangular cell or zone) may be associated with a lower point cloud that defines the exact elevation (e.g., ground elevation) of each 3D point of the lower point cloud; each cell may be associated with an upper point cloud that defines the exact elevation (e.g., crop canopy) of each 3D point of the upper point cloud (of the crop). The location-determining receiver 320 is capable of providing a current position, location, and corresponding attitude (e.g., roll angle, pitch angle and/or yaw angle) of the vehicle 402 while or when the vehicle 402 is aligned with a corresponding cell or zone, or particular position.

Figure 4B:
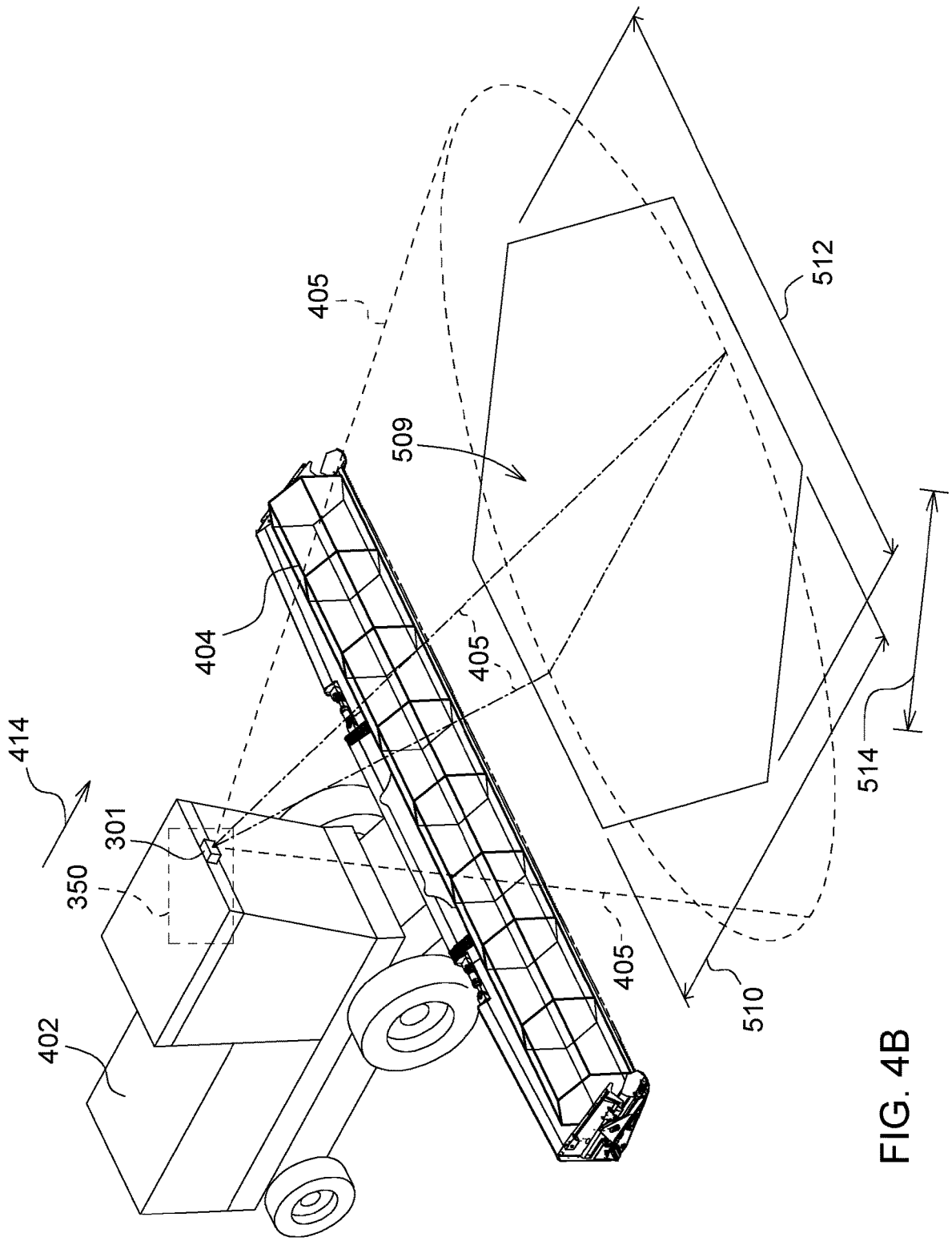
FIG. 4B illustrates another embodiment of a vehicle (e.g., combine or harvester) with a sensor for estimating an upper point cloud of a crop canopy in a field of interest (e.g., generally hexagonal field of interest) in the direction of travel of the vehicle, or a lower point cloud of the ground in the field of interest, or both.

FIG. 4B illustrates another embodiment of a vehicle 402 (e.g., combine or harvester) with a sensor for estimating an upper point cloud of a crop canopy in a field of interest (e.g., generally hexagonal field of interest) in the direction of travel 414 of the vehicle 402, or a lower point cloud of the ground in the field of interest, or both. FIG. 4B is similar to FIG. 4A, except the front region or field of interest of FIG. 4B is substantially hexagonal, rather than substantially rectangular as illustrated in FIG. 4A.

In FIG. 4B, the front region or field or interest comprises a generally hexagonal region 509, which defines a length 510 and a width 512, where the hexagonal region has face dimension or side dimension 514. The length 510 (or longitudinal dimension) is generally parallel to the direction of travel 414 of the vehicle 402, whereas the width 512 (or lateral dimension) is generally perpendicular to the direction of drive of the vehicle 402. The imaging device 301 may tend to have a substantially oval coverage pattern 406 (e.g., bounded by image boundary 405) for collection of the image data, such a stereo image data, such that multiple samples of image pairs during one or more sampling intervals are spatially aligned or stitched together to produce image data that covers the generally hexagonal region or field of interest. The entire ground surface of the field may be divided into (adjoining) hexagonal regions 509 or cells, where each cell has a ground elevation, such as an average, mean, mode ground elevation, where each cell has a ground elevation, such as an average, mean, or mode ground elevation, alone or together with an optional slope indicator, such as substantially planar, a (dominant) pitch slope angle and/or a (dominant) roll slope angle, or a (dominant) compound pitch slope angle and roll slope angle.

As provided or collected by the location-determining receiver 320, the ground surface, cell data, and/or lower point cloud data of the field may be recorded and/or stored in a data storage device 361 or in a cloud data storage, or central server for later access by the vehicle 402, via a wireless device operating over a wireless network, for later growing seasons, as a vehicle 402 traverses the same field or work area with the ground surface, which may be stable over different growing seasons or erode over time with exposure to wind, precipitation, erosion, and other natural or manmade conditions.

In some embodiments, each cell (e.g., substantially hexagonal cell or zone) may be associated with a lower point cloud that defines the exact elevation (e.g., ground elevation) of each 3D point of the lower point cloud; each cell may be associated with an upper point cloud that defines the exact elevation (e.g., crop canopy) of each 3D point of the upper point cloud (of the crop). The location-determining receiver 320 is capable of providing a current position, location, and corresponding attitude (e.g., roll angle, pitch angle and/or yaw angle) of the vehicle 402 while or when the vehicle 402 is aligned with a corresponding cell or zone, or particular position.

FIG. 5 illustrates a side view of a vehicle 402 and a potential height error 590 (e.g., ground elevation error, ground slope error, or ground tilt angle error) associated with the sensor in the direction of travel 414 of the vehicle 402 along the ground 580. In FIG. 5, the vehicle 402 may be equipped with a control system of FIG. 1 that comprises a location-determining receiver 320, an imaging device, and an electronic data processing system. As illustrated, the vehicle 402 comprises a combine or harvester with a header 404, although other off-road work ground vehicles 402 or aircraft (e.g., drones) could be used to estimate the yield of the crop.

In one embodiment, the vehicle 402 has a implement controller 357 that is configured to control an actuator (e.g., electrohydraulic cylinder or linear actuator) to adjust the height of the header 404 with respect to a ground elevation or ground profile (e.g., ground elevation and simple or compound slopes) in a corresponding cell (e.g., rectangular cell or hexagonal cell) based on one or more of the following: the current location or current position of the vehicle 402 provided by the location-determining receiver 320; a stored average elevation, stored mean elevation or stored mode elevation of the cell associated with the corresponding current location or current position of the vehicle 402 provided by the location-determining receiver 320, where the average, mean or mode elevation of the cell is stored or retrieved from a data storage device 361, central server or cloud data storage, via wireless communications device; a current attitude (e.g., roll angle, pitch angle, yaw angle or any combination of two or more attitude-related angles) of vehicle 402 provided by the location-determining receiver 320; and a stored attitude, stored pitch angle and/or stored roll angle of the respective cell associated with the corresponding current attitude, current pitch angle, current roll angle and/or current yaw angle of the vehicle 402 provided by the location-determining receiver 320, where the stored attitude, pitch angle and roll angle of the cell is stored or retrieved from a data storage device 361, central server or cloud data storage, via wireless communications device.

In FIG. 5, the projected ground height is different than the actual ground height, which can be represented by the lower point cloud in some configurations. The difference between the projected ground height and the actual ground height represents a height error 590 or height error 590, which the implement controller 357 is configured to minimize. Here, the projected ground height may result from an extrapolation of a current ground plane underlying the vehicle 402 to a projected ground plane 589 that is generally coplanar with the current ground plane. If the height error 590 were not compensated for, there is a potential height error 590 in the yield estimate or peak height of the crop in the region of interest or front region of the vehicle 402 in the direction of travel 414. Accordingly, the reference to the stored elevation data, stored attitude data, stored roll angle, and stored pitch angle of the front region or cells within the field or work area, can be used to correct or replace the projected ground plane 589 with previous elevation and attitude measurements or observations of the field or work area from prior seasons, such as a prior harvest operation of the vehicle 402 or a prior planting, treating, fertilizing, irrigating, spraying, surveying, or other agricultural operation of the vehicle 402. In some embodiments, the implement controller 357 may comprise a proportional controller, which uses negative feedback from the control signal output of the controller 324 to correct, adjust or stabilize the control signal. In other embodiments, the implement controller 357 may comprise a proportional integral controller in which a signal proportional to the height error 590 is superimposed on ramp obtained by integrating the output.

Figure 6A:
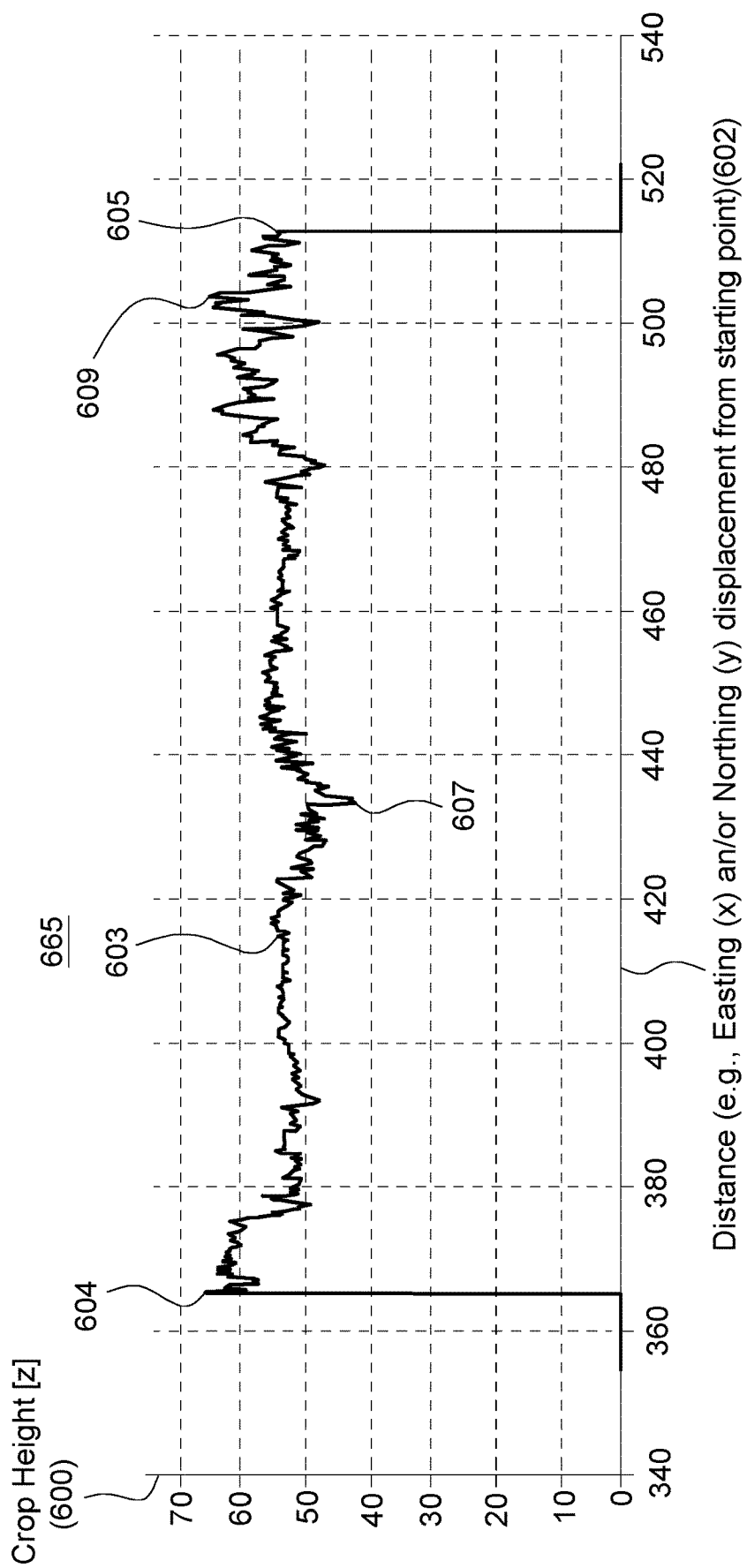
FIG. 6A is a first graph of a raw, estimated crop height versus distance along a vehicular path.

FIG. 6A is a first graph 665 of a curve or plot 603 of a raw, estimated crop height 600 versus distance 602 along a vehicular path. For example, the location-determining receiver 320 provides a current (live) or recorded ground elevation of cells or points, or a lower point cloud; the imaging system provides an upper point cloud corresponding to the plant canopy or crops above and aligned with the lower point cloud. The crop height 600 estimator is configured to determine a difference between the lower point cloud and the upper point cloud for one or more cells, zones, points (e.g., waypoints) along the path of the vehicle 402, along which the distance 602 is tracked. In FIG. 6A, the vertical axis represents a crop height 600 or plant height of crops, which is associated with a corresponding cell, zone, or point (e.g., waypoint) along the path of the vehicle 402. Meanwhile, the horizontal axis represents the distance 602 from a starting point 604 on the path of the vehicle 402 to an intermediate point or end point 605. As illustrated the crop height 600 varies between a minimum crop height 607 to a maximum crop height 609 with the distance 602 along the path, where the crop height 600 may depend upon the soil attributes, nutrients, moisture, and terrain slope, among other factors. The location-determining receiver 320 may comprise a Global Navigation Satellite System (GNSS) receiver that measures the distance 602 in terms of Easting (x) and Northing (y) displacement from the starting point 604, where the x and y axes are generally perpendicular to each other and are also perpendicular to the crop height 600 express along the z axis.

Figure 6B:
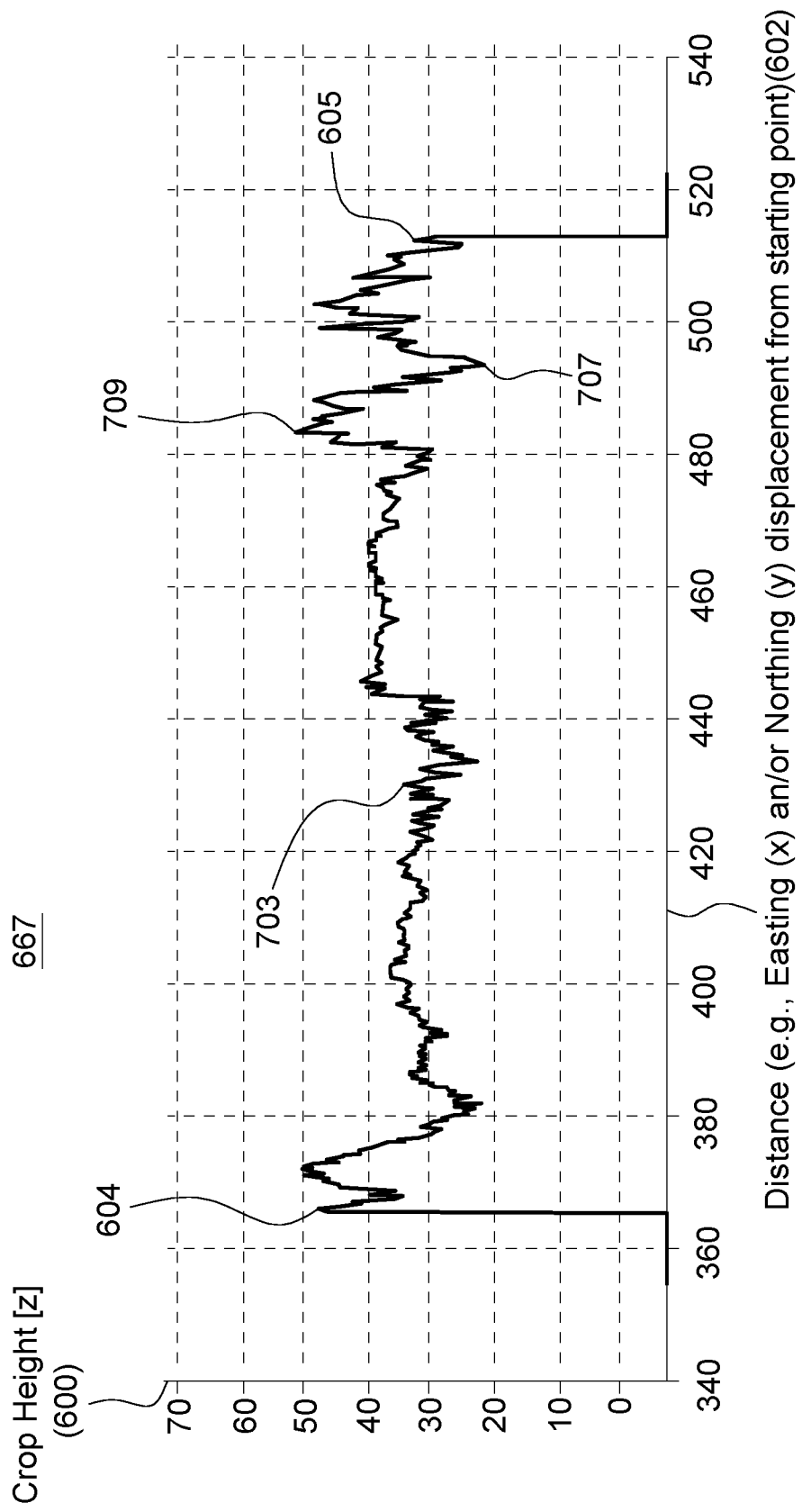
FIG. 6B is a second graph of compensated, estimated crop height versus distance along a vehicular path.

FIG. 6B is a second graph 667 of a curve or plot 703 of compensated, estimated crop height 600 versus distance 602 along a vehicular path. For example, the location-determining receiver 320 provides a current (live) and recorded ground elevation of cells or points, or a lower point cloud to determine an averaged, compensated or ground-truthed elevation, or previously observed elevation, alone or together with attitude data (e.g., pitch angle, roll angle or both), for cells in front region of region of interest in the direct of travel of the vehicle 402; the imaging system provides an upper point cloud corresponding to the plant canopy or crops above and aligned with the lower point cloud. The crop height 600 estimator is configured to determine a compensated difference between the lower point cloud and the upper point cloud for one or more cells, zones, points (e.g., waypoints) along the path of the vehicle 402, along which the distance 602 is tracked.

In FIG. 6B, the vertical axis represents a crop height 600 or plant height of crops, which is associated with a corresponding cell, zone, or point (e.g., waypoint) along the path of the vehicle 402. Meanwhile the horizontal axis represents the distance 602 from a starting point 604 on the path of the vehicle 402 to an intermediate point or end point 605. As illustrated the compensated crop height 600 varies between a minimum crop height 707 to a maximum crop height 709 with the distance 602 along the path, where the crop height 600 may depend upon the soil attributes, nutrients, moisture, and terrain slope, among other factors. The deviation of the raw crop height 600 or variation of the raw crop height 600 of FIG. 6A may represent a height error 590 (e.g., measurement error), which has the potential to be reduced in the compensated crop height 600 of FIG. 6B. The location-determining receiver 320 may comprise a Global Navigation Satellite System (GNSS) receiver that measures the distance 602 in terms of Easting (x) and Northing (y) displacement from the starting point 604, where the x and y axes are generally perpendicular to each other and are also perpendicular to the crop height 600 express along the z axis.

Figure 7A:
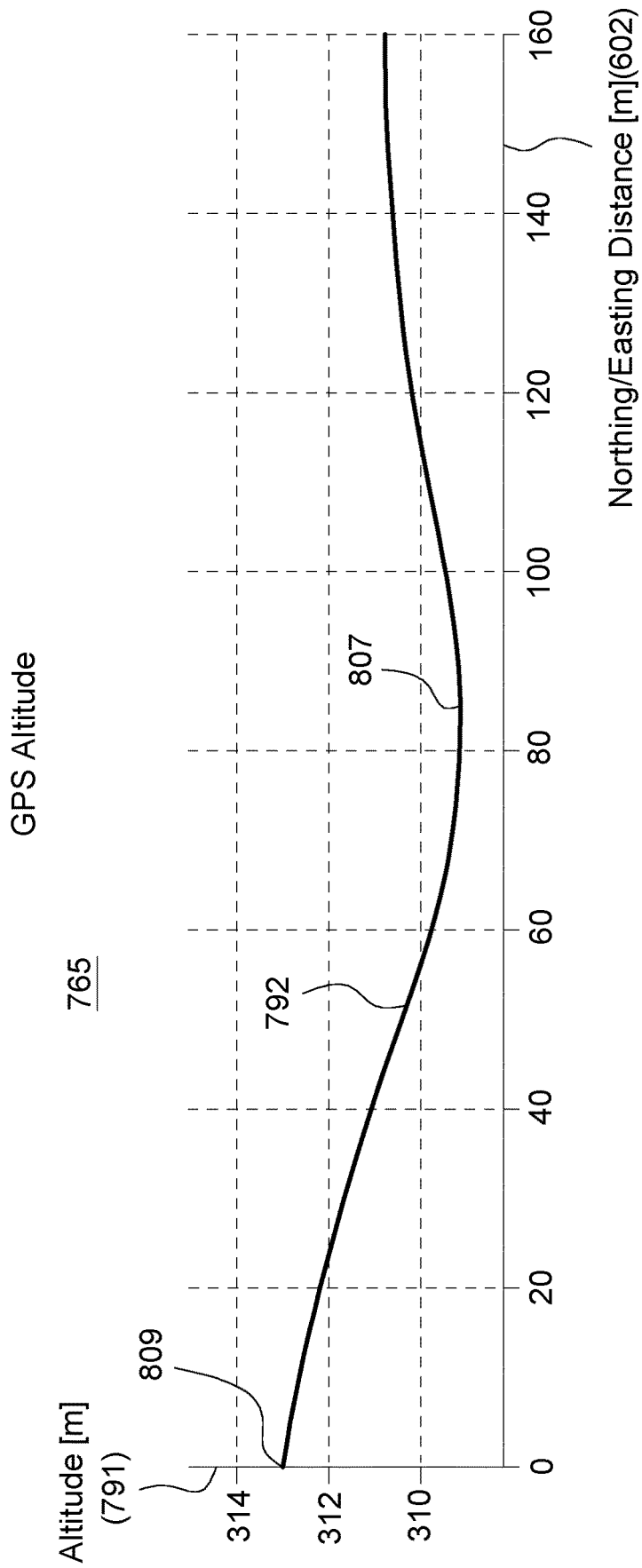
FIG. 7A is a first graph of a raw, estimated altitude (e.g., ground elevation) versus distance along a vehicular path.

FIG. 7A is a first graph 765 of curve 792 or plot of raw, estimated altitude 791 (e.g., ground elevation) along a vertical axis versus distance 602 along a vehicular path 602 along the horizontal axis. For example, the location-determining receiver 320 provides a current (live) or recorded ground elevation or altitude of cells or points, or a lower point cloud. In FIG. 7A, the vertical axis represents a ground elevation or altitude 791, which is associated with a corresponding cell, zone, or point (e.g., waypoint) along the path of the vehicle 402. Meanwhile the horizontal axis represents the distance 602 from a starting point 604 on the path of the vehicle 402 to an intermediate point or end point 605. As illustrated the ground elevation or altitude 791 varies between a minimum elevation 807 to a maximum elevation 809 with the distance 602 along the path. The location-determining receiver 320 may comprise a Global Navigation Satellite System (GNSS) receiver that measures the distance 602 in terms of Easting (x) and Northing (y) displacement from the starting point 809, where the x and y axes are generally perpendicular to each other and are also perpendicular to the altitude 791 expressed along the z axis.

Figure 7B:
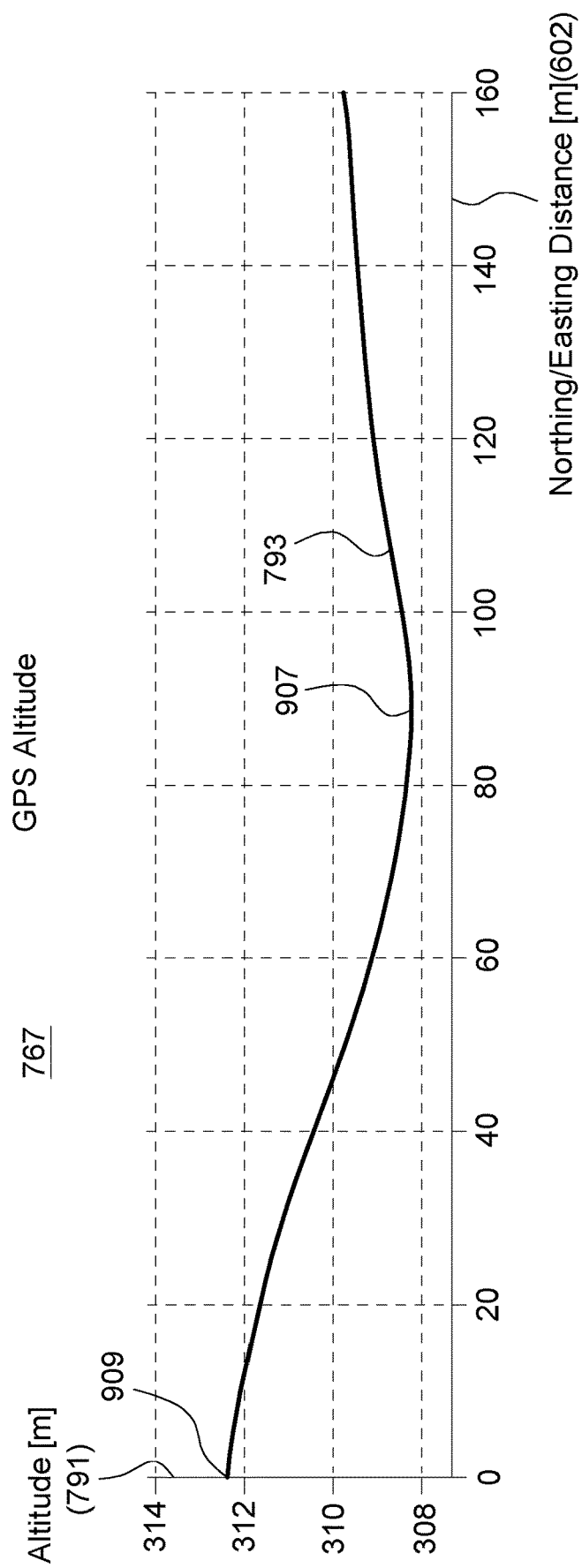
FIG. 7B is a second graph of compensated, estimated altitude (e.g., ground elevation) versus distance along a vehicular path.

FIG. 7B is a second graph 767 of a curve 793 or plot of compensated, estimated altitude 791 (e.g., ground elevation) versus distance 602 along a vehicular path. For example, the location-determining receiver 320 provides a compensated, estimated ground elevation or altitude 791 of cells or points (e.g., waypoints), or a lower point cloud based on current ground elevation observations and previous ground elevation observations (stored during the current growing season or a prior growing season) of the location-determining receiver 320, alone or together with roll angle data and pitch angle data corresponding to the cells or points (e.g., waypoints). Further, the electronic data processor 363 or ground elevation estimator 314 is configured to estimate an average, mean or mode of the current ground elevation observations and previous ground elevation observations (stored during the current growing season or a prior growing season) of the location-determining receiver 320, alone or together with roll angle data and pitch angle data corresponding to the cells or points (e.g., waypoints).

In FIG. 7B, the vertical axis represents a ground elevation or altitude 791, which is associated with a corresponding cell, zone, or point (e.g., waypoint) along the path of the vehicle 402. Meanwhile the horizontal axis represents the distance 602 from a starting point 604 on the path of the vehicle 402 to an intermediate point or end point 605. As illustrated the ground elevation or altitude varies between a minimum elevation 907 to a maximum elevation 909 with the distance 602 along the path. In FIG. 7A, the raw ground elevation or altitude along the path varies differently than the compensated ground elevation or altitude of FIG. 7B, which may tend to track the real world ground profile more accurately than the raw ground elevation. The location-determining receiver 320 may comprise a Global Navigation Satellite System (GNSS) receiver that measures the distance 602 in terms of Easting (x) and Northing (y) displacement from the starting point 604, where the x and y axes are generally perpendicular to each other and are also perpendicular to the crop height 600 express along the z axis.

Figure 8:
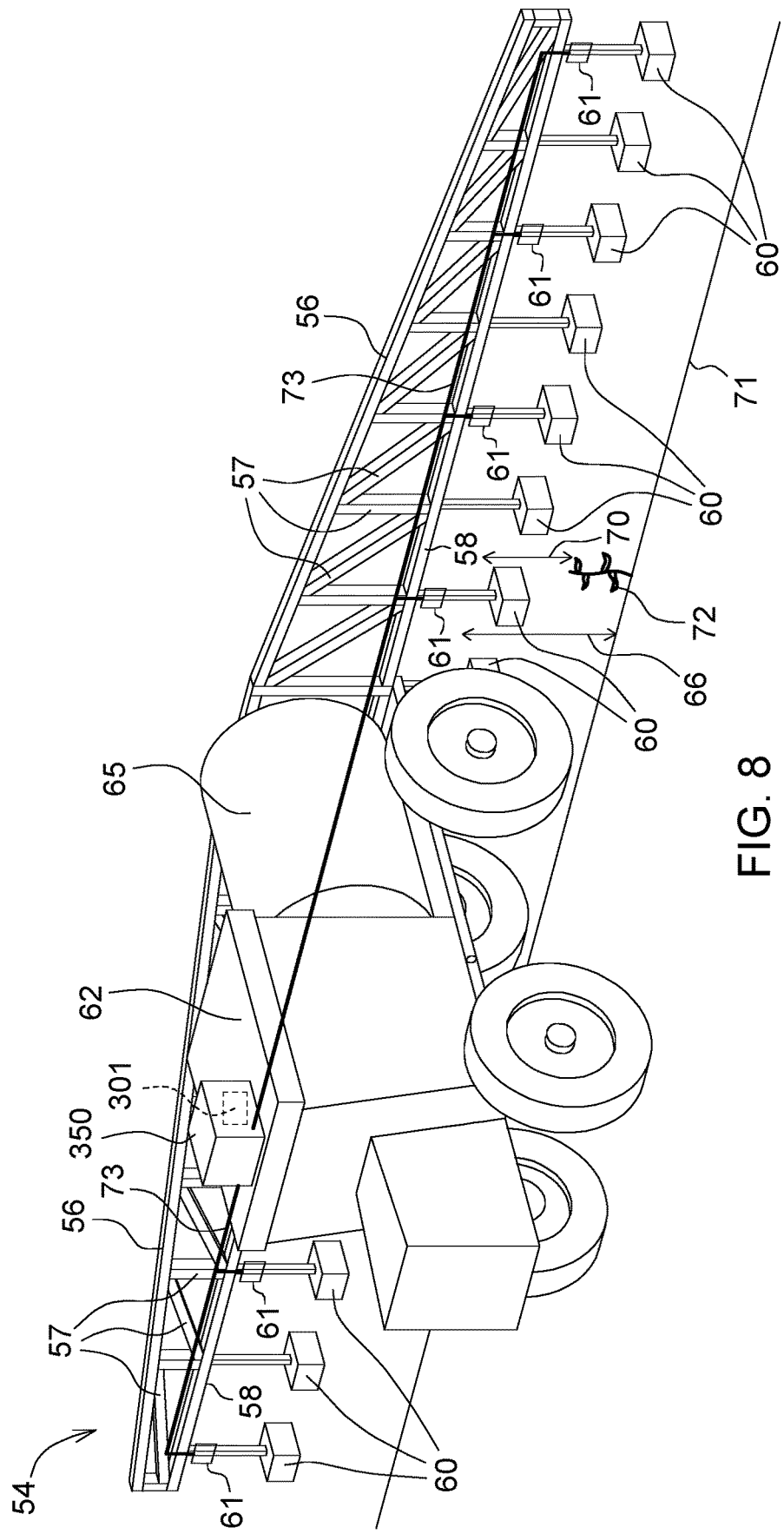
FIG. 8 illustrates a sprayer equipped with an imaging system and ground elevation sensing system.

FIG. 8 illustrates a sprayer 62 equipped with an imaging system 301 and ground elevation sensing system, which is similar to control system 350 and has at least the same components as the control system 350. In FIG. 8, a sprayer vehicle or sprayer 62 has a tank 65 and a boom 54. As illustrated, the boom 54 has an upper member 56 and a lower member 58 and structural supports 57 (e.g., structural braces). A set of sprayer nozzles 60 can be mounted on the boom 54, such as a lower member 58 of the boom 54. The sprayer nozzles 60 are coupled to pipes or hydraulic lines for conveying fluid to be sprayed from the tank 65 via a pump that is controlled by an implement controller 357.

Further, the boom 54 may have a set of sensors 61 for estimating one or more corresponding ground distances 66 between the sensor 60 to the ground 71, one or more corresponding plant distances 70 between the sensor 61 to the top of the plant canopy of plants or plant rows, or both. Depending upon the maturity of the row crops, the unplanted ground 71 or soil between the plant rows may be visible or within line-of-sight sensing of one or more sensors 61. The sensors 61 are coupled to the control system 350 via transmission lines 73 or a wireless communications link, with a terminal communications device at the sensor 61 and a primary (e.g., master or multipoint) communications device at the control system coupled to the data bus 362 via a communications data port (e.g., input/output port).

In one embodiment, each sensor 61 may comprise an imaging device, a monocular camera, a stereo camera, an ultrasonic sensor, a range finder, LIDAR system, a radar system, or the like to provide observations or measurements of the ground elevation along the length of the boom, which can be recorded as an elevation map or contour elevation map of a field or worksite. For example, each sensor 61 may provide plant distances 70 and ground distances 66 for corresponding positions (e.g., two or three dimensional geographical coordinates) of the sprayer 62 at the sprayer 62 progresses through the field. The sprayer 62 is equipped with a location-determining receiver 320 that provides, pairs, correlates, or indexes the position of the vehicle, or its implement (e.g., boom 54 and nozzles 60), or both to a set of lateral ground elevation measurements derived from any of the following: one or more ground distances 66 and one or more plant distances 70 (e.g., to plants 72, such as row-aligned plants) along either lateral side (e.g., right or left side) of the boom 54.

The sprayer vehicle 62 may be operating during the growing season prior to a harvesting operation of the harvester or combine, where the sprayer 62 may perform an agricultural task such as spraying chemicals, fertilizer, nutrients, fungicides, insecticides, biocides, water or other crop inputs.

Figure 9:
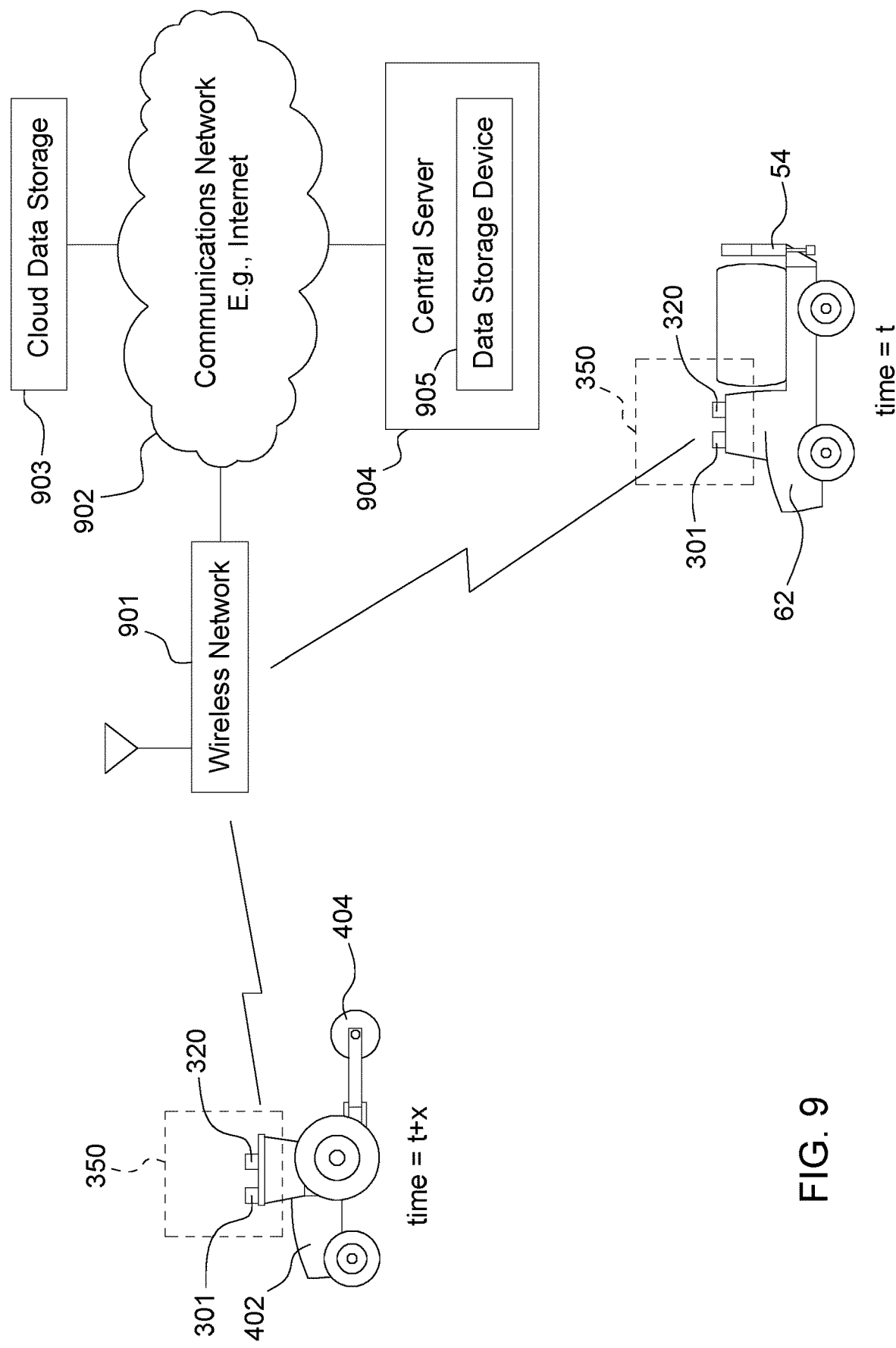
FIG. 9 shows a diagram of a first vehicle (e.g., sprayer) at a first time and second vehicle (e.g., combine or harvester) at a second time after the first time, where elevation data is communicated from the first vehicle to a central server or cloud storage for access by the second vehicle.

FIG. 9 shows a diagram of a first vehicle (e.g., sprayer) at a first time and second vehicle (e.g., combine or harvester) at a second time (e.g., t+x) after the first time (e.g., t), where elevation data is communicated from the first vehicle to a central server or cloud storage for access by the second vehicle. Like reference numbers in any two drawings indicate like features, elements, or steps.

The first vehicle may comprise a sprayer 62 that is equipped with a boom 54 and control system 350. The control system 350 has a imaging device 301, a location-determining receiver 320, and a wireless communications device 378 (e.g., transceiver) that is coupled to a data port 377, among other things. Similarly, the second vehicle may comprise a combine 402 or harvester, where its control system 350 has an imaging device 301, a location determining receiver 320, and a wireless communications device 378 (e.g., transceiver) that is coupled to a data port 377, among other things.

Although the first vehicle is illustrated as a sprayer 62 in FIG. 8 and FIG. 9, the first vehicle may comprise a planter, a tractor, tillage equipment, survey vehicle, or other agricultural equipment in alternate embodiments. The first vehicle may perform a first agricultural task at a corresponding first time that predates a second agricultural task to be performed by the second vehicle. For example, the first agricultural task may comprise tilling, planting, cultivating, spraying, irrigating, fertilizing, or treating the soil or crops, whereas the second agricultural task may comprise harvesting the crop.

During the same growing season, or during another growing season, the first vehicle or sprayer 62 may acquire, obtain or collect ground elevation data versus location data from one or more of the following: location-determining receiver 320, imaging device 301, and sensors 61. The ground elevation estimator 314 may store any of the following elevation-related data in a data storage device (905, 361), on a central server 904 or in a cloud data storage 903: ground elevation data and associated location data (e.g., geographical coordinates), attitude data (e.g., roll angle, and tilt angle data), and/or recorded elevation map or contour elevation map. On the sprayer 62, the wireless communications device 377 of the control system 350 transmits the elevation-related data via a wireless communications signal to a wireless communications network 901. The wireless communications network 901 is coupled to a communications network, 902, such as packet switched network, a telecommunications network, a public switched telephone network, a fiber optic network, or the Internet.

In turn, the communications network 902 is capable of communicating with the central server 904, cloud data storage 903 or both. The central server 904 is associated with a data storage device 905, which is local or distributed data storage, or cloud data storage 903. The data storage device (905, 361), on the central server 904 or in cloud storage environment, is capable of storing, managing and retrieving the elevation related data, such as ground elevation data and associated location data (e.g., geographical coordinates), attitude data (e.g., roll angle, and tilt angle data), and/or recorded elevation map or contour elevation map. For instance, the central server 904 or cloud data storage 903 may be authorized to communicate wirelessly with a wireless communications device 377 on the harvester, combine or other second vehicle for later retrieval by the control system 350 of the harvester or combine during a harvesting operation.

As referenced in this disclosure, via the wireless communications device 378 the ground elevation estimator 314, or the electronic data processor 363 of the control system 350 of the harvester or combine can reference, retrieve, download, read or access the stored elevation-related data on the central server 904, the data storage device 905, or cloud data storage 903. In one configuration, the stored elevation-related data comprises a recorded elevation map or contour elevation map, to average or process (e.g., statistically process) with ground elevation measurements of the imaging system 301 as the harvester or combine progresses through the field or work site, such as to provide improved or corrected elevation data versus position throughout the field or work site. Subject to authentication, security, and license subscription requirements, the requested or accessed elevation-related data is provided to the requesting wireless communications device 378 of the harvester or combine 402 via the communications network 902 (e.g., Internet) and wireless communications network 901 (e.g., cellular communications network, such as a code division multiple access (CDMA) or a time division multiplex (TDM) system).

While the above describes example embodiments of the present disclosure, these descriptions should not be viewed in a limiting sense. Rather, other variations and modifications may be made without departing from the scope and spirit of the present disclosure as defined in the appended claims.

The following is claimed:

1. A method for controlling a vehicle for performing an agricultural task on an agricultural material in a field or at a worksite, the method comprising:
    collecting a stereo vision data to determine a crop three-dimensional representation or upper point cloud of an upper portion of a crop canopy in a front region in front of the vehicle;
    estimating an observed ground elevation data based on a current observed position data of a location-determining receiver, the current observed position data comprising an altitude data and an attitude data of the ground associated with the front region;
    accessing a stored ground elevation data based on a prior position data that aligns with the current observed position data, the prior position data comprising the altitude data and the attitude data of the ground;
    determining an average or weighted average of the observed ground elevation data and the stored ground elevation data for the aligned prior position data and the current observed position data;
    estimating a ground three-dimensional representation or lower point cloud of the ground based on the determined average;
    transforming or aligning the collected stereo vision data to a common coordinate system of the estimated lower point cloud of the ground;
    determining differences between the upper point cloud of the crop canopy and a lower point cloud of the ground, where each difference is associated with a cell within a grid defined by the front region;
    providing the differences to a data processing system to estimate a yield or differential yield for the front region; and
    adjusting a ground speed or a ground velocity of the vehicle when the yield or differential yield in one or more cells satisfies a threshold, or exceeds a lower yield limit, or is less than an upper yield limit.

2. The method according to claim 1, further comprising:
    estimating, by a location-determining receiver or global navigation satellite receiver on the vehicle or an implement mechanically coupled to the vehicle, prior ground elevation data and corresponding prior position data; and
    recording or storing, in a data storage device, the prior ground elevation data associated with corresponding prior position data of the vehicle or the implement mechanically coupled to the vehicle that is performing the agricultural task in the field or at the worksite.

3. The method according to claim 2, wherein the agricultural task comprises planting, seeding, tilling or spraying.

4. The method according to claim 1, further comprising:
    estimating, by a location-determining receiver or global navigation satellite receiver, prior ground elevation data and corresponding prior position data;
    determining, by a stereo vision imaging device coupled to the vehicle for performing tillage, planting or seeding, prior ground elevation data associated with the corresponding prior position data; and
    recording or storing, in a data storage device, the prior ground elevation data associated with corresponding prior position data of the vehicle or an implement mechanically coupled to the vehicle that is performing an agricultural task in the field or at the worksite.

5. The method according to claim 4, further comprising transforming or mapping an initial coordinate reference frame of the prior ground elevation data of the stereo imaging device to a common coordinate reference frame of the location-determining receiver.

6. The method according to claim 1, further comprising:
estimating, by a location-determining receiver or global navigation satellite receiver, prior ground elevation data and corresponding prior position data;
determining, by one or more range or distance sensors on a boom of the vehicle configured as a sprayer vehicle, prior ground elevation data associated with the corresponding prior position data; and
recording or storing, in a data storage device, the prior ground elevation data associated with corresponding prior position data of the vehicle or an implement mechanically coupled to the vehicle that is performing an agricultural task in the field or at the worksite.

7. The method according to claim 6, further comprising transforming or mapping an initial coordinate reference frame of the prior ground elevation data of the range or distance sensors to a common coordinate reference frame of the location-determining receiver.

8. The method according to claim 1, wherein estimating the differential yield comprises determining the difference between the crop height and ground elevation to estimate yield or volume or mass of plant material to be harvested by the vehicle configured as a combine or harvester within one or more cells.

9. A method for controlling a vehicle for performing an agricultural task on an agricultural material in a field or at a worksite, the method comprising:
collecting a stereo vision data to determine a crop three-dimensional representation or upper point cloud of an upper portion of a crop canopy in a front region in front of the vehicle;
estimating an observed ground elevation data based on a current observed position data of a location-determining receiver, the current observed position data comprising an attitude data of the ground associated with the front region;
accessing a stored ground elevation data based on a prior position data that aligns with the current observed position data, the prior position data comprising an altitude data and the attitude data of the ground that is averaged over time for the field or worksite;
estimating a ground three-dimensional representation or lower point cloud of the ground based on the stored ground elevation data;
transforming or aligning the collected stereo vision data to a common coordinate system of the estimated lower point cloud of the ground;
determining differences between the upper point cloud of the crop canopy and a lower point cloud of the ground, where each difference is associated with a cell within a grid defined by the front region;
providing the differences to a data processing system to estimate a yield or differential yield for the front region; and
adjusting a ground speed or a ground velocity of the vehicle when the yield or differential yield in one or more cells satisfies a threshold, or exceeds a lower yield limit, or is less than an upper yield limit.

10. The method according to claim 9, further comprising determining differential settings of vehicle speed or velocity related to harvesting of the crop associated with the front region.

11. The method according to claim 9, further comprising adjusting the speed or velocity of the vehicle to maintain a target throughput or output of estimated ground elevation.

12. The method according to claim 9, wherein the attitude data comprises roll angle data associated with the vehicle, and
wherein the lower point cloud of the ground is adjusted to account for the roll data over a vehicle width or swath or for a roll-adjusted ground region between a plurality of vehicle wheels or tracks.

13. The method according to claim 9, wherein the attitude data comprises roll angle, pitch angle, and heading angle data associated with the vehicle and wherein the lower point cloud of the ground is adjusted to account for the pitch angle data for a pitch-adjusted ground region between a front wheel and a rear wheel or between a front and a rear vehicle tracks or a pitch-adjusted ground region between a vehicle front and a vehicle rear is adjusted to account for the pitch angle.

14. The method according to claim 9, wherein an upper boundary of an upper cell of the upper point cloud is projected downward to a corresponding lower boundary of a lower cell of the lower point cloud or where the lower boundary of the lower cell of the lower point cloud is projected upward to the corresponding upper boundary of the upper cell of the upper point cloud.

15. The method according to claim 14, wherein points of the point cloud lying on the upper boundary or the lower boundary have pairs of equal x-y plane coordinates, with different z coordinates.

16. The method according to claim 14, wherein a corresponding three dimensional volume of an upper-lower cell pair between the upper boundary and the lower boundary is indicative of the yield or vigor of plants or crops in the cell.

17. The method according to claim 16, wherein an aggregate yield of cells within the front region is used to adjust a vehicle setting, and to calibrate or supplement a yield detected by the yield monitoring during a time interval.

18. The method according to claim 16, wherein an aggregate yield of cells within an entire field region is used to estimate the yield of the crop, alone or together with observed measurements of a yield monitor.

19. The method according to claim 14, wherein an average, mean, median or mode of a difference between an upper height for a corresponding upper cell and a lower height for a lower cell is indicative of the yield or vigor of plants or crops in the cell.

20. The method according to claim 9, wherein one or more points or cells within the lower point cloud of the ground are adjusted or corrected based on previously stored elevation surveys of the field.

21. The method according to claim 9, wherein the location-determining receiver comprises a global navigation satellite system and a wireless device that operates in a real-time kinematic (RTK) mode and that receives a correction signal from a local or applicable RTK reference station.

22. The method according to claim 9, wherein the location-determining receiver comprised a global navigation satellite system and a wireless device that operates in a precise point positioning (PPP) mode and that receives a correction signal from a central data processing system associated with a network of satellite receiver reference stations.

23. The method according to claim 9, further comprising a radar or LIDAR device that is directed toward the front region of the vehicle to provide potential adjustments or augmentation of the elevation data versus position or geographic coordinates of the lower point cloud of the ground.

\* \* \* \* \*